(12) United States Patent
Fuller et al.

(10) Patent No.: US 9,786,941 B2
(45) Date of Patent: Oct. 10, 2017

(54) METAL IONOPHORES IN PEM MEMBRANES

(75) Inventors: Timothy J. Fuller, Pittsford, NY (US); Ion C. Halalay, Grosse Pointe Park, MI (US); Lijun Zou, Rochester, NY (US); Michael R. Schoeneweiss, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 979 days.

(21) Appl. No.: 13/611,694

(22) Filed: Sep. 12, 2012

(65) Prior Publication Data
US 2014/0072900 A1 Mar. 13, 2014

(51) Int. Cl.
| H01M 8/10 | (2016.01) |
| C08J 5/22 | (2006.01) |
| H01M 8/1004 | (2016.01) |
| H01M 8/1044 | (2016.01) |
| H01M 8/1023 | (2016.01) |
| H01M 8/1039 | (2016.01) |
| H01M 8/1081 | (2016.01) |

(52) U.S. Cl.
CPC ......... *H01M 8/1004* (2013.01); *C08J 5/2218* (2013.01); *H01M 8/1023* (2013.01); *H01M 8/1039* (2013.01); *H01M 8/1044* (2013.01); *H01M 8/1081* (2013.01); *C08J 2371/12* (2013.01); *Y02P 70/56* (2015.11)

(58) Field of Classification Search
USPC ................................................ 429/482, 493
See application file for complete search history.

(56) References Cited

U.S. PATENT DOCUMENTS

| 5,312,537 | A | * | 5/1994 | Harrison et al. | 204/416 |
| 7,888,433 | B2 | | 2/2011 | Fuller et al. | |
| 7,897,691 | B2 | | 3/2011 | MacKinnon et al. | |
| 7,897,692 | B2 | | 3/2011 | MacKinnon et al. | |
| 7,897,693 | B2 | | 3/2011 | MacKinnon et al. | |
| 7,960,046 | B2 | | 6/2011 | Fuller et al. | |
| 8,053,530 | B2 | | 11/2011 | Fuller et al. | |
| 2007/0099054 | A1 | | 5/2007 | Fuller et al. | |
| 2010/0330451 | A1 | * | 12/2010 | Shinozaki | H01M 4/8605 429/482 |

FOREIGN PATENT DOCUMENTS

KR    10-2005-0119366    * 12/2005    .............. H01M 8/02

OTHER PUBLICATIONS

Jennifer A. Irvin, Polyimides for Battery and Fuel Cells Membranes, Fuel Chemistry Division Preprints, Mar. 27, 2003, 48(1), pp. 441-442.*

(Continued)

*Primary Examiner* — Osei Amponsah
(74) *Attorney, Agent, or Firm* — Brooks Kushman P.C.

(57) ABSTRACT

A membrane electrode assembly for fuel cells includes a proton conducting membrane having a first side and a second side. The proton conducting membrane in turn includes a first polymer including cyclic polyether groups and a second polymer having sulfonic acid groups. The membrane electrode assembly further includes an anode disposed over the first side of the proton conducting layer and a cathode catalyst layer disposed over the second side of the proton conducting layer.

10 Claims, 14 Drawing Sheets

(56) References Cited

OTHER PUBLICATIONS

Montanari, F. et al., "Hydroxymethyl Derivatives of 18-Crown-6 and [2.2.2]Cryptand: Versatile Intermediates for the Synthesis of Lipophilic and Polymer-Bonded Macrocyclic Ligands," J. Org. Chem., 1982, 47, 1298-1302.
Babb, D.A., "Synthesis and Metal Ion Complexation of Synthetic Ionophores," a Ph.D. Dissertation in Chemistry, Texas Tech University, Dec. 1985.
Smid, J. et al., "Synthesis of 4'-vinylbenzocrown ethers," Organic Preparation and Procedures Int., 1976, 8(4), 193-196.
Kopolow, S. et al., "Poly(vinylmacrocyclic polyethers), Synthesis and Cation Binding Properties," Macromolecules, 1973, 6, 133.

\* cited by examiner

US 9,786,941 B2

METAL IONOPHORES IN PEM MEMBRANES

FIELD OF THE INVENTION

In at least one aspect, the present invention relates to proton exchange membranes for fuel cells with improved stability.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power. Although the polymer membranes currently used in PEM fuel cells work reasonably well, such membranes are susceptible to crack propagation and mechanical failure.

Accordingly, there is a need for proton exchange membranes with improved chemical stability.

SUMMARY OF THE INVENTION

The present invention solves one or more problems of the prior art by providing a membrane electrode assembly for a fuel cell. The membrane electrode assembly includes a proton conducting membrane having a first side and a second side. The proton conducting membrane in turn includes a first polymer including an ionophore and a second polymer having sulfonic acid groups. Characteristically, the ionophores are cyclic polyether groups. The membrane electrode assembly further includes an anode disposed over the first side of the proton conducting layer and a cathode catalyst layer disposed over the second side of the proton conducting layer.

In another embodiment, a membrane electrode assembly for a fuel cell is provided. The membrane electrode assembly includes a proton conducting membrane having a first side and a second side. The proton exchange layer includes a plurality of nanoparticles comprising a first polymer having ionophoric cyclic polyether groups and a second polymer having sulfonic acid groups. The membrane electrode assembly further includes an anode disposed over the first side of the proton conducting layer and a cathode catalyst layer disposed over the second side of the proton conducting layer.

In yet another embodiment, a fuel cell incorporating the membrane electrode assemblies set forth above is provided. The fuel cell includes a membrane electrode assembly interposed between an anode gas diffusion layer and a cathode gas diffusion layer. The resulting assembly is typically interposed between an anode flow field plate and a cathode flow field plate.

In still another embodiment, a polyelectrolyte membrane is made by dispersing a polymer or ionophore having cyclic polyether groups (e.g., polycyclic crown ether or cryptand) with an ionomer in a liquid (as a solution, dispersion or suspension), followed by centrifugation and solution casting of the supernate and then drying.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
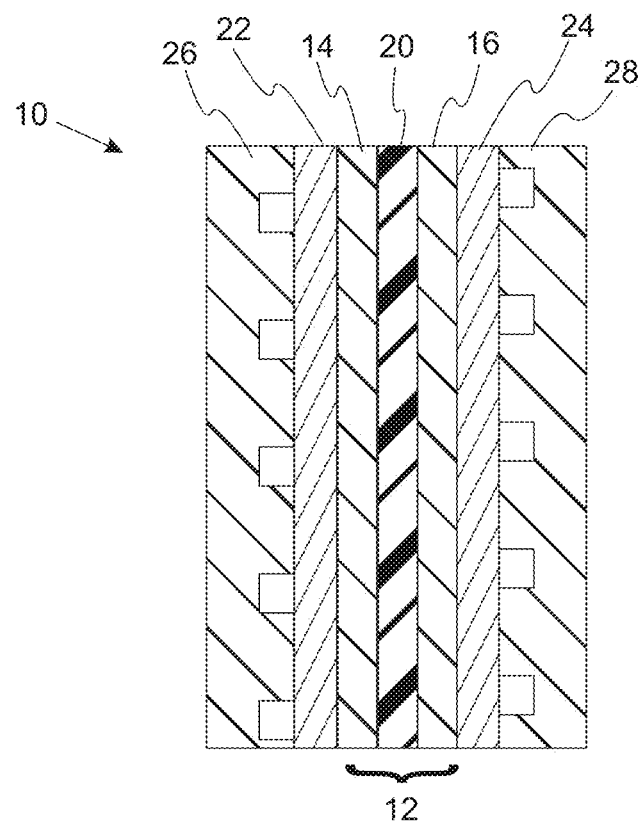
FIG. 1 is a schematic illustration of a fuel cell that incorporates a PEM with a compound including cyclic polyether groups.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a fuel cell having a membrane electrode assembly that incorporates cyclic polyether moieties is provided. Fuel cell 10 includes the membrane electrode assembly 12 which includes anode catalyst layer 14, cathode catalyst layer 16, and ion conducting membrane (i.e., proton exchange membrane) 20. Proton (i.e., ion) conducting membrane 20 is interposed between anode catalyst layer 14 and cathode catalyst layer 16 with anode catalyst layer 14 disposed over the first side of proton conducting membrane 20 and cathode catalyst layer 16 disposed over the first side of proton conducting membrane 20. Characteristically, proton conducting membrane 20 includes an ion conducting polymer (i.e., an ionomer) having sulfonic acid groups and a compound having cyclic polyether groups. In a variation, fuel cell 10 also includes porous gas diffusion layers 22 and 24. Gas diffusion layer 22 is disposed over anode catalyst layer 14 while gas diffusion layer 24 is disposed over cathode catalyst layer 16. In yet another variation, fuel cell 10 includes anode flow field plate 26 disposed over gas diffusion layer 22 and cathode flow field plate 28 disposed over gas diffusion layer 24.

In a variation, the membrane electrode assembly includes a proton conducting membrane having a first side and a second side. The proton exchange layer includes a second polymer having sulfonic acid groups and a plurality of nanoparticles comprising a first polymer having cyclic polyether groups. In particular, the nanoparticles are polymeric beads with cyclic polyether-containing groups appended thereto. Polymeric beads functionalized with cyclic polyether groups are made by the emulsion polymerization of styrene with 3 to 40 wt. % divinylbenzene as a crosslinking agent. Emulsion polymerized beads of vinyl monomers with ionophores are made typically with 10 wt % divinylbenzene as a crosslinking agent. Commercial crosslinked polystyrene beads with polymer anchored bipyridyl groups (available from Sigma-Aldrich) and a poly(vinylbenzo-18-crown-6) in the form of 120 nm beads that are crosslinked with divinylbenzene are also useful in sequestering metal ions.

The present embodiment includes a first polymer having cyclic polyether groups. Typically, the first polymer having cyclic polyether groups is a polymer. In a refinement, the first polymer having cyclic polyether groups is part of a polymeric bead. In a refinement, the cyclic polyether groups are monocyclic or polycyclic (e.g, 2 rings) having 12 to 45 member rings. In another refinement, the cyclic polyether groups are monocyclic or polycyclic (e.g, 2 rings) having 12 to 42 member rings. In another refinement, the cyclic polyether groups are monocyclic or polycyclic (e.g, 2 rings) having 12 to 39 member rings. In still another refinement, the cyclic polyether groups are monocyclic or polycyclic (e.g, 2 rings) having 12 to 36 member rings. In a refinement, the size of each ring in the cyclic polyether groups is a multiple of three. Examples of suitable polymers having cyclic polyether groups include polymers or polymeric beads including crown ether or cryptand groups. In a further refinement, one or more atoms in the polyether ring may be substituted by nitrogen atoms (azacrowns) or sulfur atoms (thiacrowns). The crown ether may also be substituted at any location along its polyether ring by any of a variety of groups known to those skilled in the art.

In the context of the present invention, the polymers having cyclic polyether groups are ionophores. Such ionophores work advantageously in three different ways. First, ionophores when added to ionomer solutions sequester metals ions which are initially present as impurities in the ionomers and the solvents. Some of the sequestered metal ions include the Fenton's active catalysts that form hydroxyl radical with hydrogen peroxide such as iron(II), nickel(II), cobalt(II) and copper ions. Other cations, such as aluminum (III), sodium, potassium, and the like, are also sequestered. As complexes with ionophores, these ions do not as readily form hydroxyl radicals by reaction with hydrogen peroxide in the membranes like the free ions such as $Fe^{2+}$. Hydrogen peroxide is generated as a side reaction by the electrode catalyst during fuel cell operation, and hydroxyl radicals are known to cause chemical degradation failures in fuel cell membranes. In this way, the ionophores act as a chemical mitigant to prevent membrane degradation. Second, these ionophores act to sequester metal ions that are introduced into the membranes as contaminants during fuel cell operation, and in particular, $Fe^{2+}$ generated from the reaction of acidic fuel cell by-products (such as HF) with stainless steel plates. The metal ionophore complexes prevent a parasitic, autocatalytic degradation due to $Fe^{2+}$ introduced during fuel cell operation. Third, the ionophores with sequestered metal ions can be removed entirely from the ionomer coating solutions by centrifugation before the membrane is coated. The metal ions bind to the ionophores forming a complex which are removed by centrifugation. In this way, treatment of ionomer solutions can be used to purify ionomer solutions before membrane coating takes place. This separation process is especially advantageous when the ionophore-metal complexes are in the form of insoluble beads, fibers, particles precipitates, or sediments. All three mechanisms involving polymeric metal ionophore complexes are beneficial in improving the chemical stability of fuel cell membranes.

Examples of cyclic polyether groups include, but are not limited to, the following structures:

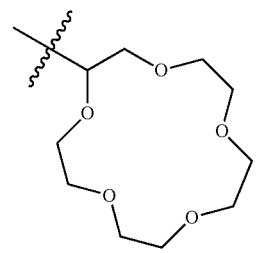

(1)

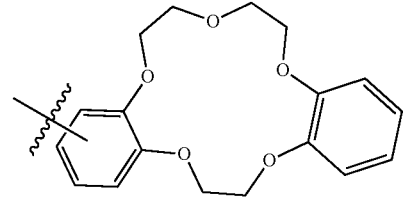

(2)

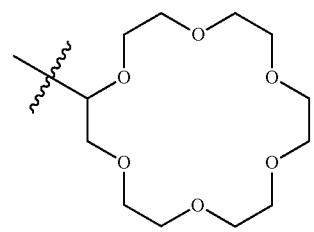

(3)

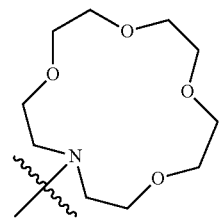

(4)

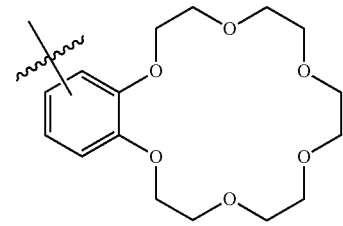

(5)

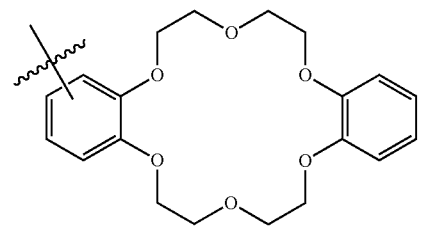

(6)

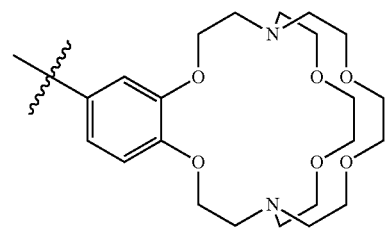

(7)

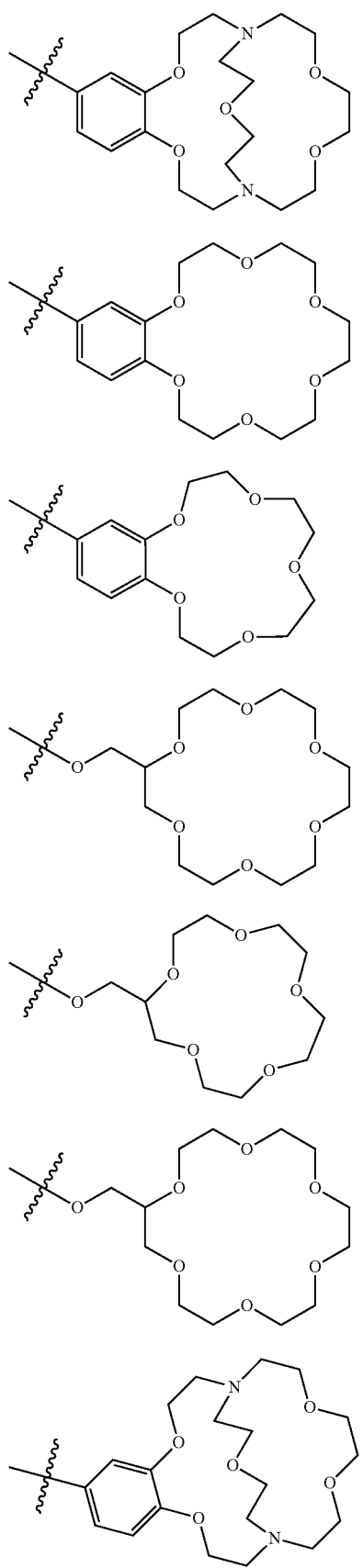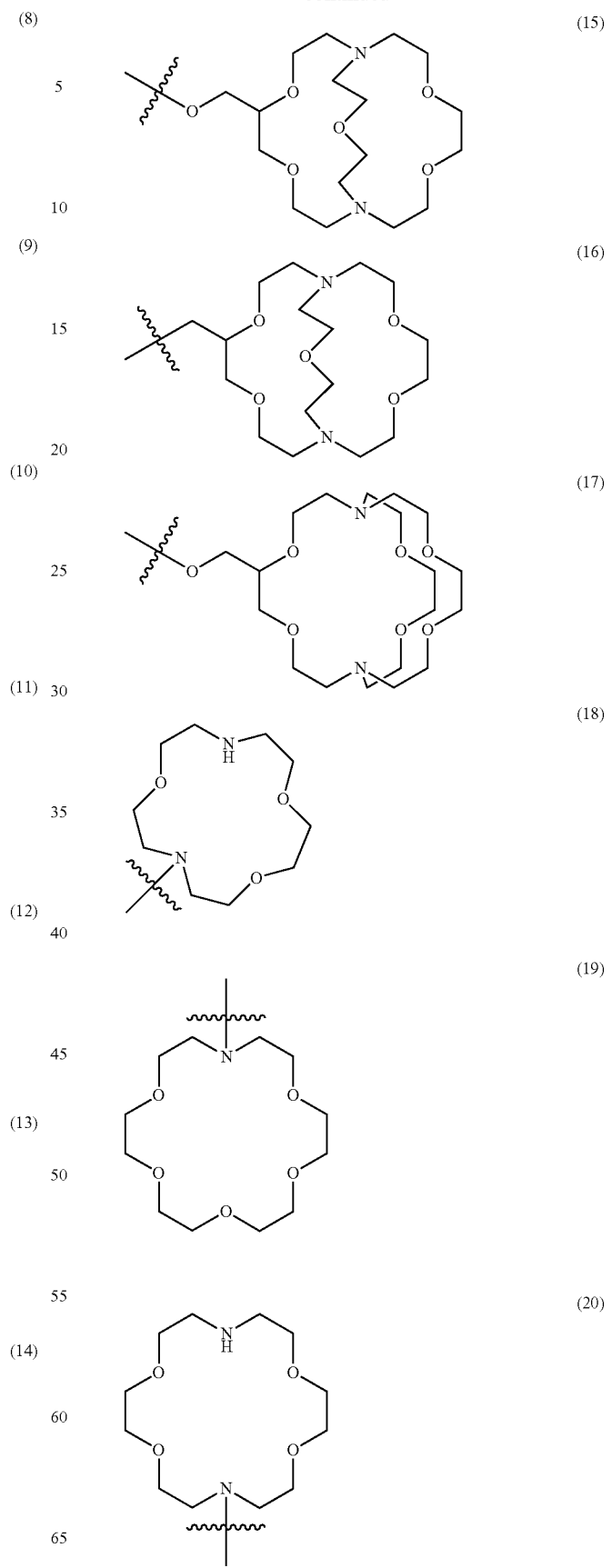

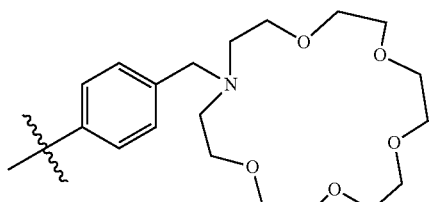
(21)

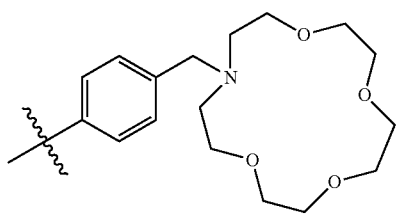
(22)

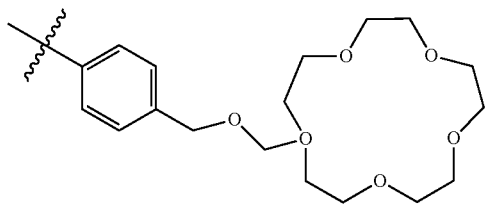
(23)

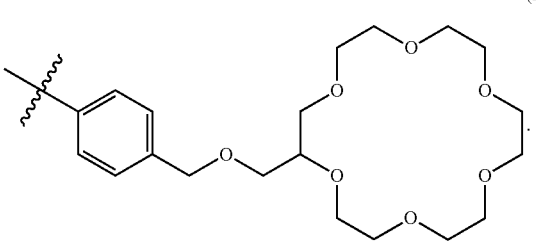
(24)

As used herein, the line crossed by a wiggly line in chemical formulae represents the point of attachment of a chemical group to a polymer or other chemical group or structure.

In a variation of the present embodiment, the first polymer having cyclic polyether groups is a polymer. As used herein, the term polymer includes oligomers. In a refinement, such a polymer is a linear polymer. Such a linear polymer may be represented by the following formulae:

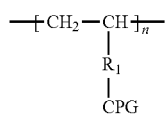
(25)

where $R_1$ is absent or a hydrocarbon group and CPG is a cyclic polyether group. When $R_1$ is absent the polymer with formula (24) reduces to:

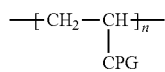
(25')

In a refinement, the CPG are selected from the groups of formulae I through 23. Examples of hydrocarbon groups for $R_1$ include but are not limited to, $C_{1-20}$ alkyl groups, $C_{1-18}$ polyether groups, $C_{6-20}$ alkylaryl groups, $C_{6-20}$ aryl groups (e.g., phenyl, napthlyl, etc.), $C_{1-10}$ alkyl groups, or $C_{1-5}$ alkyl groups. As used herein, alkylaryl groups are groups in which an alkyl group is attached to an aromatic group (e.g., phenyl). In such groups, the alkyl group is bonded to the polymeric backbone and the aromatic group to the cyclic polyether group or the aromatic group is bonded to the polymeric backbone and the alkyl group is bonded to the cyclic polyether group. It should be appreciated that these examples include substituted or unsubstituted alkyl groups as well as branched or unbranched groups. Examples of substituted groups have one or more hydrogen atoms replaced by Cl, F, Br, OH, $NO_2$, —CN, and the like. In a refinement, the polymers having formulae (24) and (25) are formed by polymerization of compounds having formula (26) and (27) respectively:

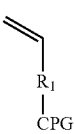
(26)

(27)

In a refinement, the first polymer having cyclic polyether groups is present in an amount from about 1 to 15 weight percent of the total weight of the proton conducting membrane. In another refinement, the first polymer having cyclic polyether groups is present in an amount from about 2 to 10 weight percent of the total weight of the proton conducting membrane. In another refinement, the first polymer having cyclic polyether groups is present in an amount from about 3 to 7 weight percent of the total weight of the proton conducting membrane. Although the polycrown ethers, polymeric cryptands, and the like are added at about 1 to 15 wt. % of the ionomer, the cyclic polycrown additive can have from 1 to 100% of the monomers having cyclic polyether groups.

In another variation, the first polymer including cyclic polyether groups is a cyclic oligomer. Such cyclic oligomers may be formed from polymerization (e.g., emulsion polymerization) of compounds having formula 26 or 27 and a divinyl compound such as a compound described by formula 28:

28 where $R_2$ is a hydrocarbon group. Examples of suitable hydrocarbon groups for $R_2$ include, but are not limited to, $C_{1-20}$ alkyl groups, $C_{6-20}$ dialkylaryl groups, $C_{6-20}$ aryl groups (e.g., phenyl, napthlyl, etc), $C_{1-10}$ alkyl groups, or $C_{1-5}$ alkyl groups. A dialkylaryl group includes an aromatic ring with two alkyl groups bonded thereto. An example of such a cyclic oligomer has the following formula:

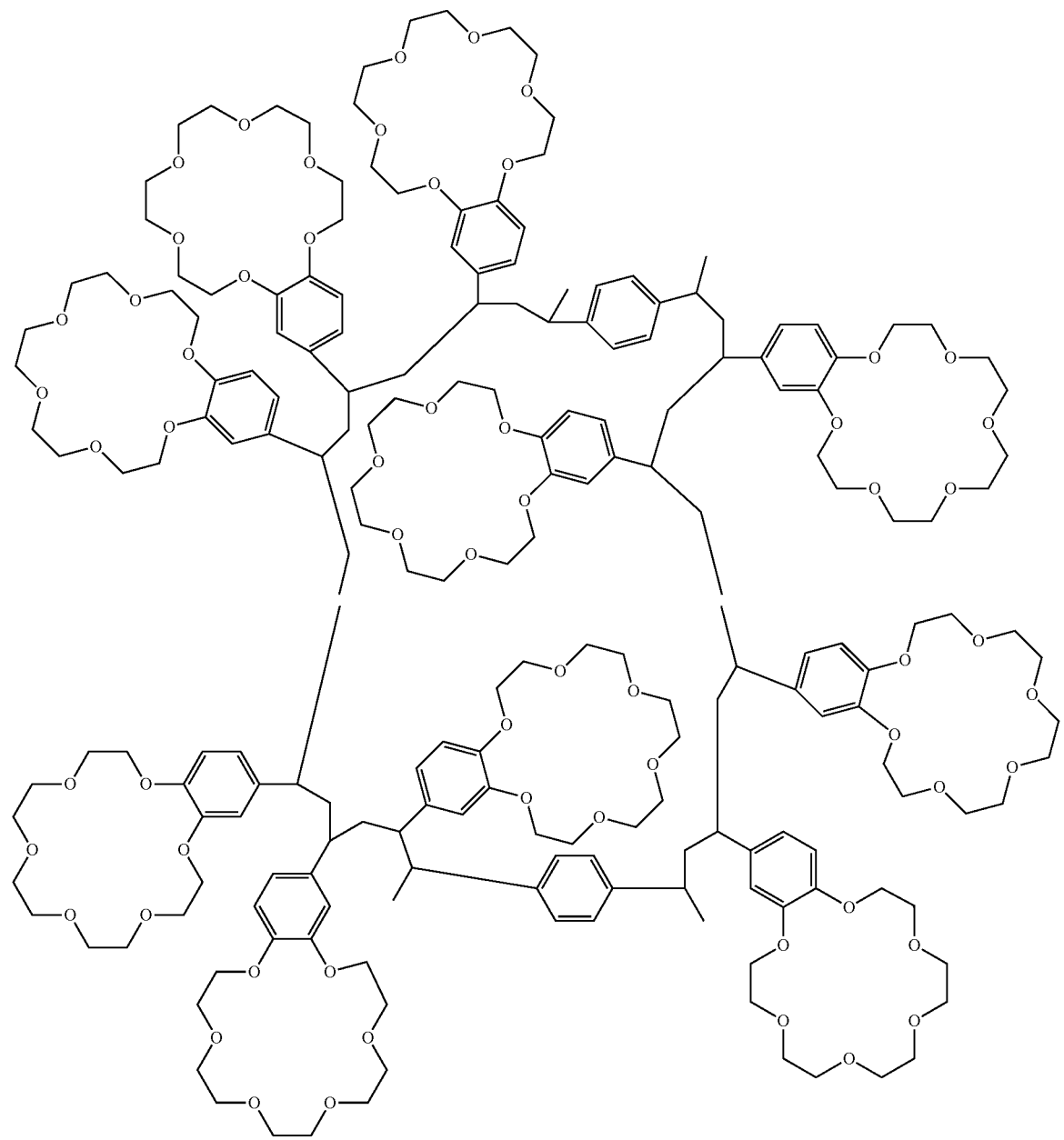
29A

-continued

29B

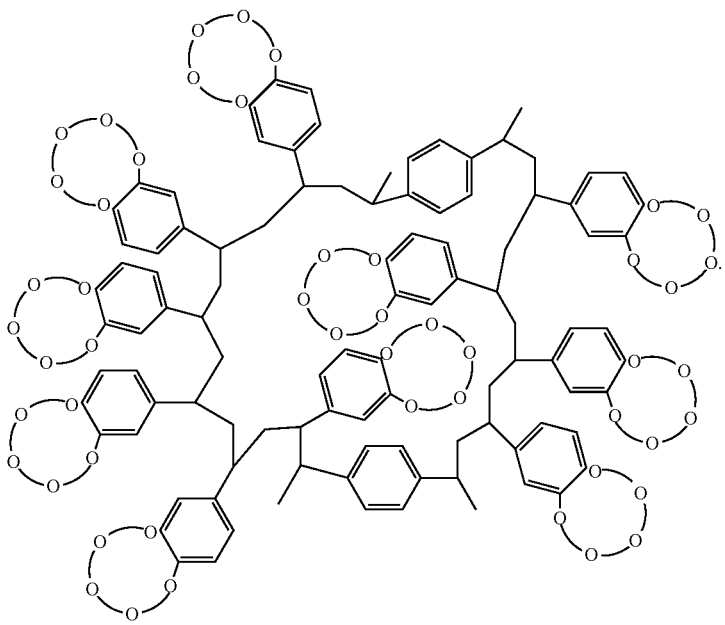

Structures analogous to 29A and B but made with vinylbenzo-15-crown-5 instead of vinylbenzo-18-crown-6 are also useful additives to the ionomers.

In a variation, the cyclic oligomer is formed by polymerization (e.g., emulsion polymerization) of a compound having formula 30:

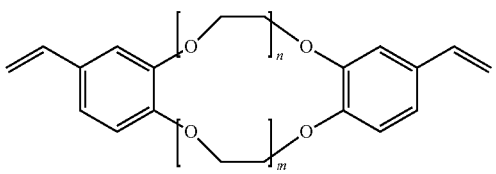

where n and m are each independently an integer from 1 to 8. In a refinement, n and m are each independently an integer from 1 to 4. In a further refinement, n and m are equal. Such polymerization may or may not be in the presence of a compound having formula 28.

As set forth above, membrane electrode assembly 12 includes a second polymer having sulfonic acid groups. Examples of such ion conducting polymers include, but are not limited to, perfluorosulfonic acid (PFSA) polymers, polymers having perfluorocyclobutyl moieties, and combinations thereof. Examples of useful PFSA polymers include a copolymer containing a polymerization unit based on a perfluorovinyl compound represented by:

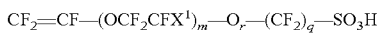

where m represents an integer of from 0 to 3, q represents an integer of from 1 to 12, r represents 0 or 1, and $X^1$ represents a fluorine atom or a trifluoromethyl group and a polymerization unit based on tetrafluoroethylene. Suitable polymers including perfluorocyclobutyl moieties are disclosed in U.S. Pat. Pub. No. 2007/0099054, U.S. Pat. No. 7,897,691 issued Mar. 1, 2011; U.S. Pat. No. 7,897,692 issued Mar. 1, 2011; U.S. Pat. No. 7,888,433 issued Feb. 15, 2011, U.S. Pat. No. 7,897,693 issued Mar. 1, 2011; and U.S. Pat. No. 8,053,530 issued Nov. 8, 2011, the entire disclosures of which are hereby incorporated by reference. Examples of perfluorocyclobutyl moieties are:

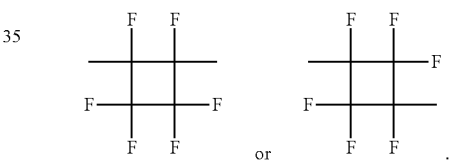

As set forth above, membrane electrode assembly 12 includes an anode catalyst layer 14 and cathode catalyst layer 16. In a variation, these catalyst layers are formed of porous conductive materials, such as woven graphite, graphitized sheets, or carbon paper to enable the fuel and oxidant to disperse over the surface of the membrane facing the fuel- and oxidant-supply electrodes, respectively. Each catalyst layer has finely divided catalyst particles (for example, platinum particles) supported on carbon particles to promote oxidation of hydrogen at the anode and reduction of oxygen at the cathode. In another variation, the catalyst layers are formed by depositing a catalyst ink on ion conducting membrane 20 by direct spraying or coating in a shim frame. In still another variation, the catalyst layers are formed on a decal and transferred to ion conducting membrane 20. Alternatively, a catalyst/ionomer ink can be coated on a gas diffusion medium substrate, which is known as a catalyst coated diffusion media (CCDM). The catalyst inks are typically prepared as a solution of a proton conducting polymer or ionomer (e.g. NAFION™), with particles of electrically conductive material, typically carbon, and particles of catalyst. The electrically conductive material, e.g., carbon, is typically the catalyst support of the ink and the catalyst is typically a metal. In a variation, the catalyst layer dispersion consists of a mixture of the precious metal catalyst supported on high surface carbon (e.g., Vulcan XC-72) and an ionomer solution such as NAFION™ (DuPont Fluoroproducts, NC) in a solvent. Examples of useful catalysts include, but are not limited to, metals such as platinum, palladium; and mixtures of metals platinum and molybdenum, platinum and cobalt, platinum and ruthenium, platinum and nickel, and platinum and tin. The ionomer is typically purchased in a solvent and at the desired initial concentration. Additional solvent is optionally added to adjust the ionomer concentration to a desired concentration. In a refinement, the catalyst inks optionally contain polytetrafluoroethylene. The catalyst and catalyst support are dispersed in the ink by techniques such as ultrasonication or ball-milling. Typically, the average agglomerate size is in the range from 50 to 500 nm. In a refinement, the ink includes, for a 100 gram sample, an amount on the order of 0.5 to 5 grams of 5 to 80 wt. % catalytically active material on carbon (e.g., platinum on carbon), and on the order of 5 to 20 grams of 1 to 30 wt. % ionomer solution with a solvent. In still another refinement, the weight ratio of ionomer to carbon is in the range of 0.20:1 to 2.0:1. In another refinement, the weight ratio of ionomer to carbon is in the range of 0.25:1 to 1:1. In still another refinement, the ratio of solids to liquids in the ink is in the range of 0.15:1 to 0.35:1 (i.e., 13% to 27% by weight solids). A more preferred range is 0.2:1 to 0.3:1 or 16% to 23% by weight of solids in the slurry. In a particular refinement, the solvent makes up about 80% of the ink weight, and catalyst, ionomer, and carbon makes up the remaining 20%. Useful solvents include, but are not limited to, alcohols (e.g., propanol, ethanol, methanol), water, or a mixture of water and alcohols. Characteristically, the solvents evaporate at room temperature. In a further refinement, In still another embodiment, a polyelectrolyte membrane is made by dispersing a polymer or ionophore having cyclic polyether groups (e.g., polycyclic crown ether or cryptand) with an ionomer in a liquid (as a solution, dispersion or suspension), followed by centrifugation and solution casting of the supernatant and then drying. In this embodiment, the addition of ionophoric particles (second polymer having cyclic polyether groups) sequester cations such as $Fe^{2+}$, which are then removed by centrifugation before the membrane is coated. In this way, the ionophoric particles purify the ionomer solution and facilitate the preparation of metal cation free membranes. In particular, ionophore polymer are added to a solution of the ionomer before solution casting of the membrane with added acid. The metal-cation ionophore polymer complex is then removed by filtration, centrifugation, and the like.

In another variation, the catalyst inks are homogenized by ball-milling for about three days before coating on the PEM, decal substrate, or gas diffusion medium. For shim coating, the catalyst loading can be controlled by the thickness of the shim; for the Mayer wire-wound rod coating, the catalyst loading can be controlled by the wire number. Multiple coatings can be applied for higher catalyst loading, as needed. After applying the wet ink, the solvents are dried in an oven to drive off the solvent and form the electrode. After the catalyst/ionomer coated decal dries, the catalyst/ionomer is then transferred onto a PEM by hot press to form an MEA. The anode and cathode can be hot-pressed onto a PEM simultaneously.

The following examples illustrate the various embodiments of the present invention. Those skilled in the art will recognize many variations that are within the spirit of the present invention and scope of the claims.

Synthetic Overview of Polymer-Bound Crown Ethers and Cryptands

The preparations of 2-hydroxymethyl-18-crown-6 (compound 31), 2-hydroxymethyl-15-crown-5 (compound 32), and 2-hydroxymethyl-[2.2.2]cryptand (compound 33) are described in Fernando Montanari and Pietro Tundo, "*Hydroxymethyl Derivatives of* 18-*Crown*-6 *and* [2.2.2] *Cryptand: Versatile Intermediates for the Synthesis of Lipophilic and Polymer-Bonded Macrocyclic Ligands*," J. Org. Chem., 1982, 47, 1298-1302; the entire disclosure of which is hereby incorporated by reference:

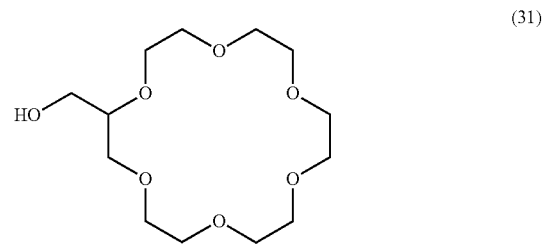

(31)

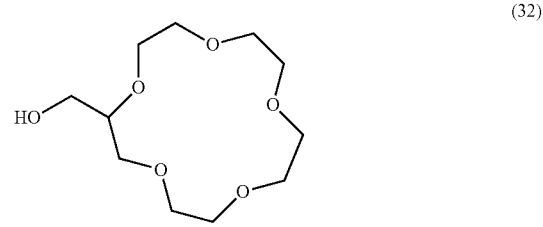

(32)

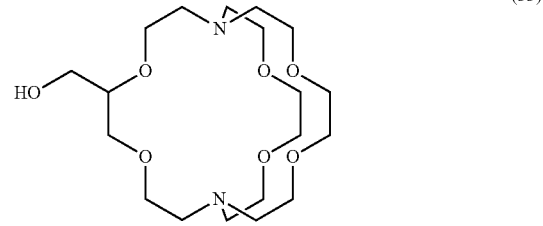

(33)

Alcohols are easily converted to compounds with vinyl groups, for example by reaction with 1-(chloromethyl)-3-vinylbenzene or 1-(chloromethyl)-4-vinylbenzene. An alternative synthesis routes to 2-hydroxymethyl-18-crown-6,2-hydroxymethyl-15-crown-5, and 2-hydroxymethyl-[2.2.2] cryptand are reported in a Ph. D. dissertation by David Alan Babb, "Synthesis and Metal Ion Complexation of Synthetic Ionophores," A Ph.D. Dissertation in Chemistry, Texas Tech University, December, 1985; the entire disclosure of which is hereby incorporated by reference.

The syntheses of 4'-vinylbenzo-crown ethers such as compounds 34 and 35 are reported in J. Smid, B. El Haj, T. Majewicz, A. Normi, and R. Sinta, "Synthesis of 4'-vinyl-benzocrown Ethers." *Organic Preparations and Procedures Int.*, 1976, 8(4), 193-196.

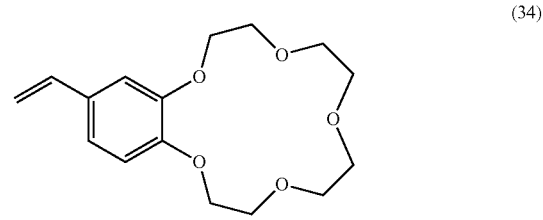

(34)

-continued (35)

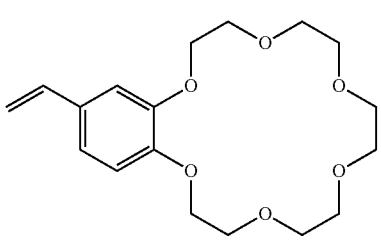

It should be noted that a bisvinylbenzo-macrocyle is also made in one step by the reaction of compound 36 with methyltriphenylphosphonium bromide and n-butyllithium in diethyl ether or thetrahydrofuran (the Wittig reaction).

(36)

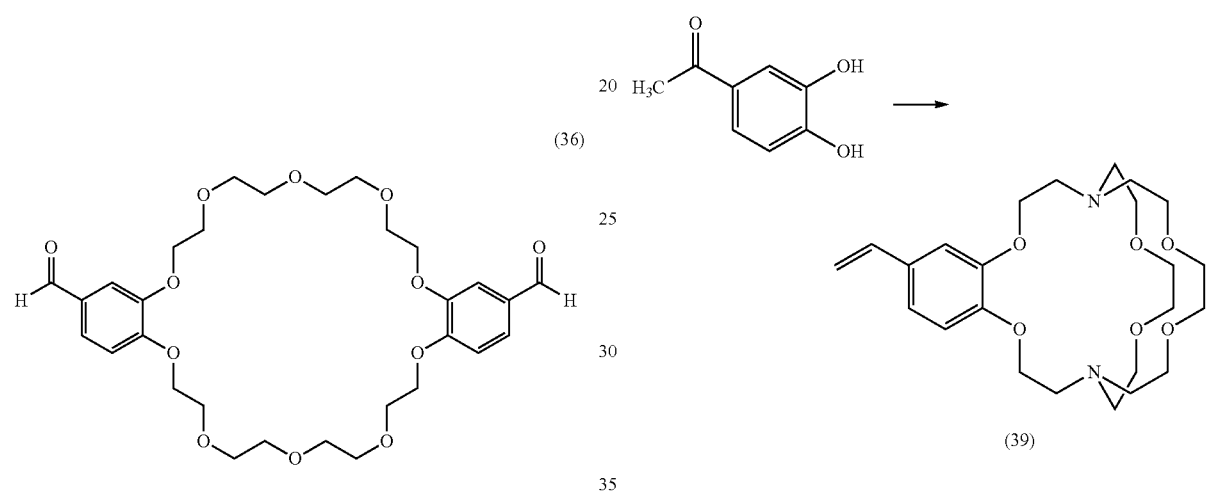

Another approach to compounds 34 and 35 is reported in the reference: S. Kopolow, T. E. Hogen Esch, and J. Smid, "Poly(vinylmacrocyclic polyethers). Synthesis and Cation Binding Properties," *Macromolecules*, 1973, 6, 133; the entire disclosure of which is hereby incorporated by reference.

Figure 2:
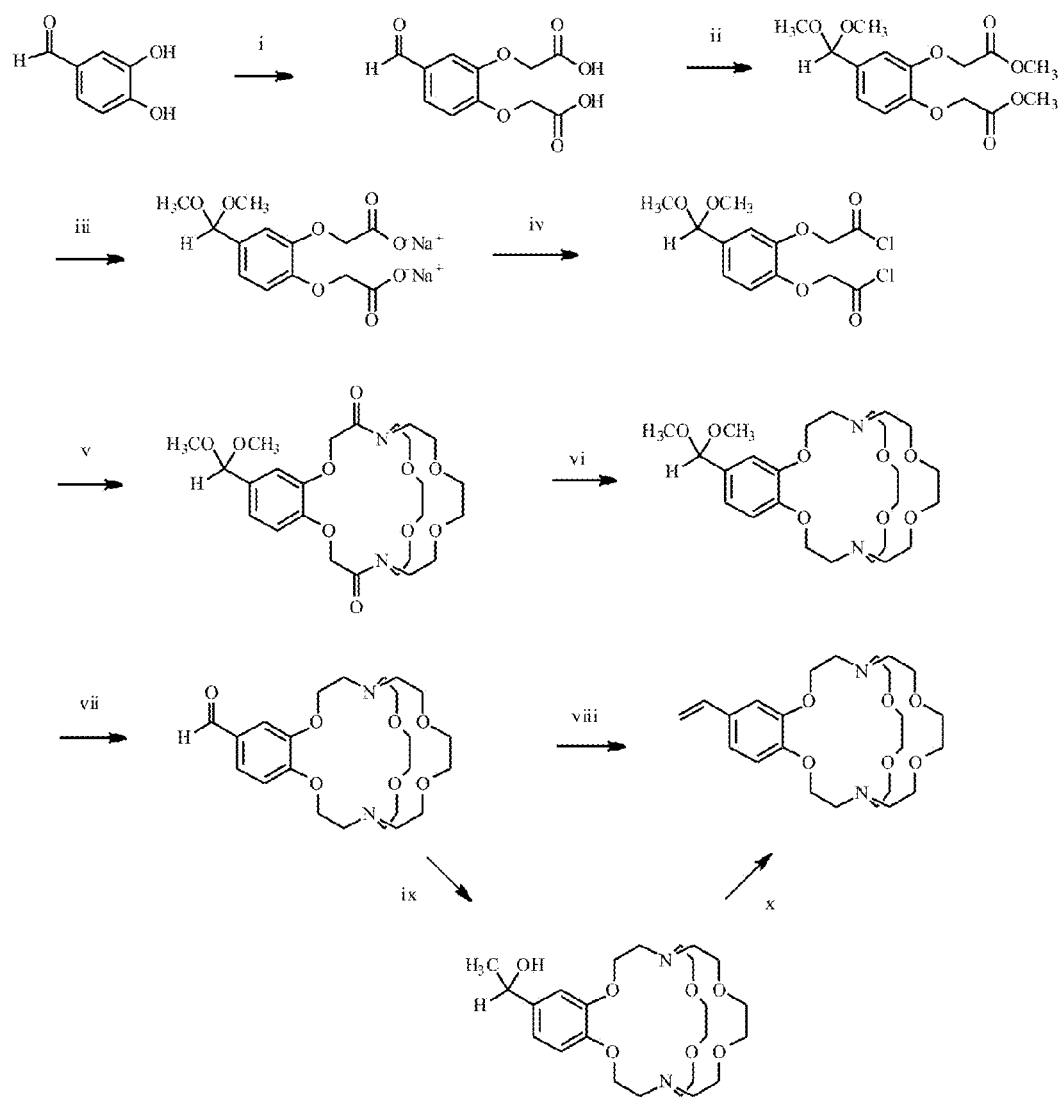
FIG. 2 provides a synthetic pathway for cyclic polyether compounds with the following: (i) $ClH_2CCOOH/K^{+-}Ot$-$Bu$; (ii) $CH_3OH/H^+$; (iii) NaOH; (iv) oxalyl chloride or a. NaOH, b. pyridine/$SOCl_2$; (v) 1,4,10,13-tetraoxa-7,16-diazacyclooctadecane; (vi) $LiAlH_4$ or $BH_3$/THF; (vii) $H^+$; (viii) methyltriphenylphosphonium bromide/n-butyl lithium; (ix) methylmagnesium iodide; (x) p-toluenesulfonic acid.
Figure 3:
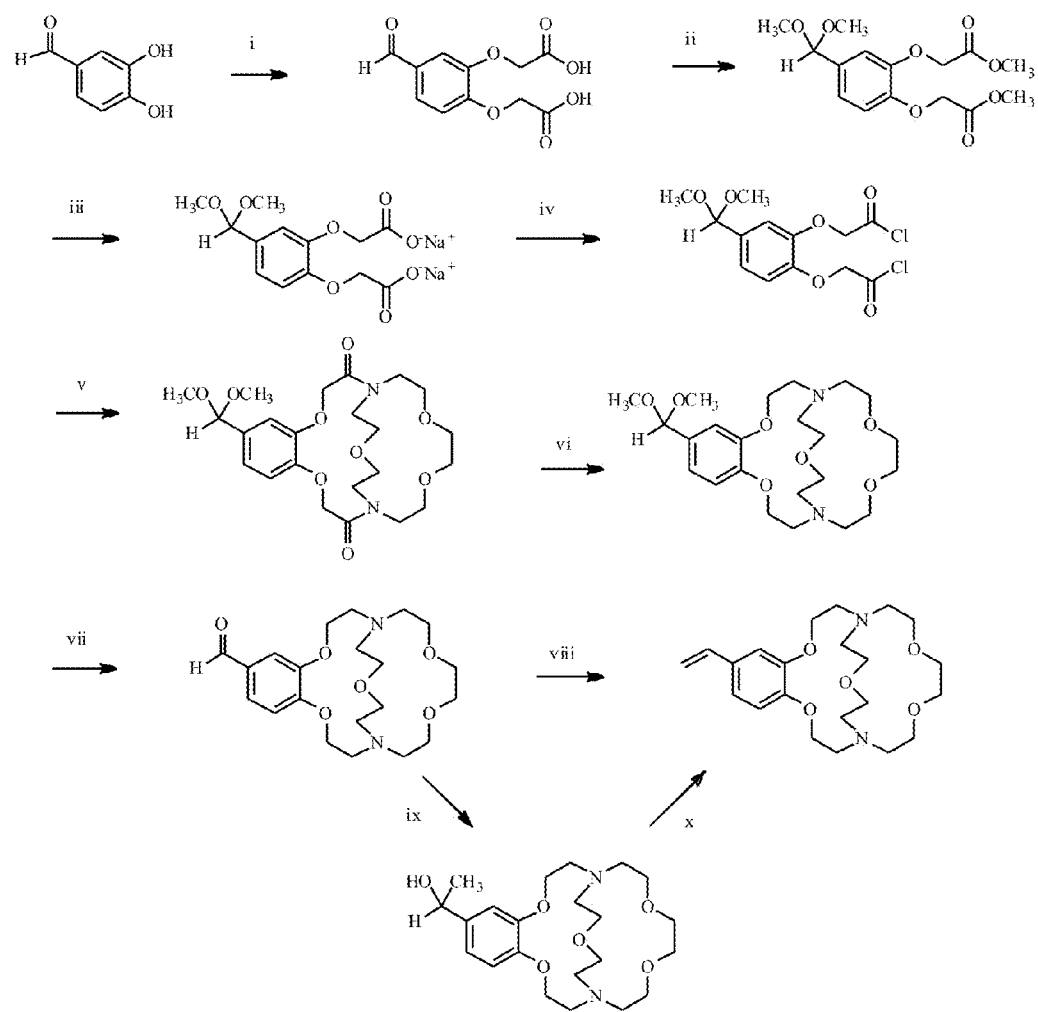
FIG. 3 provides a synthetic pathway for cyclic polyether compounds with the following: Pathway 6. (i) $ClH_2CCOOH/K^{+-}Ot$-$Bu$; (ii) $CH_3OH/H^+$; (iii) NaOH; (iv) oxalyl chloride or a. NaOH, b. pyridine/$SOCl_2$; (v) 1,4,10,13-trioxa-7,13-diazacyclopentade cane; (vi) $LiAlH_4$ or $BH_3$/THF; (vii) $H^+$; (viii) methyltriphenylphosphonium bromide/n-butyl lithium; (ix) methylmagnesium iodide; (x) p-toluenesulfonic acid.
Figure 4:
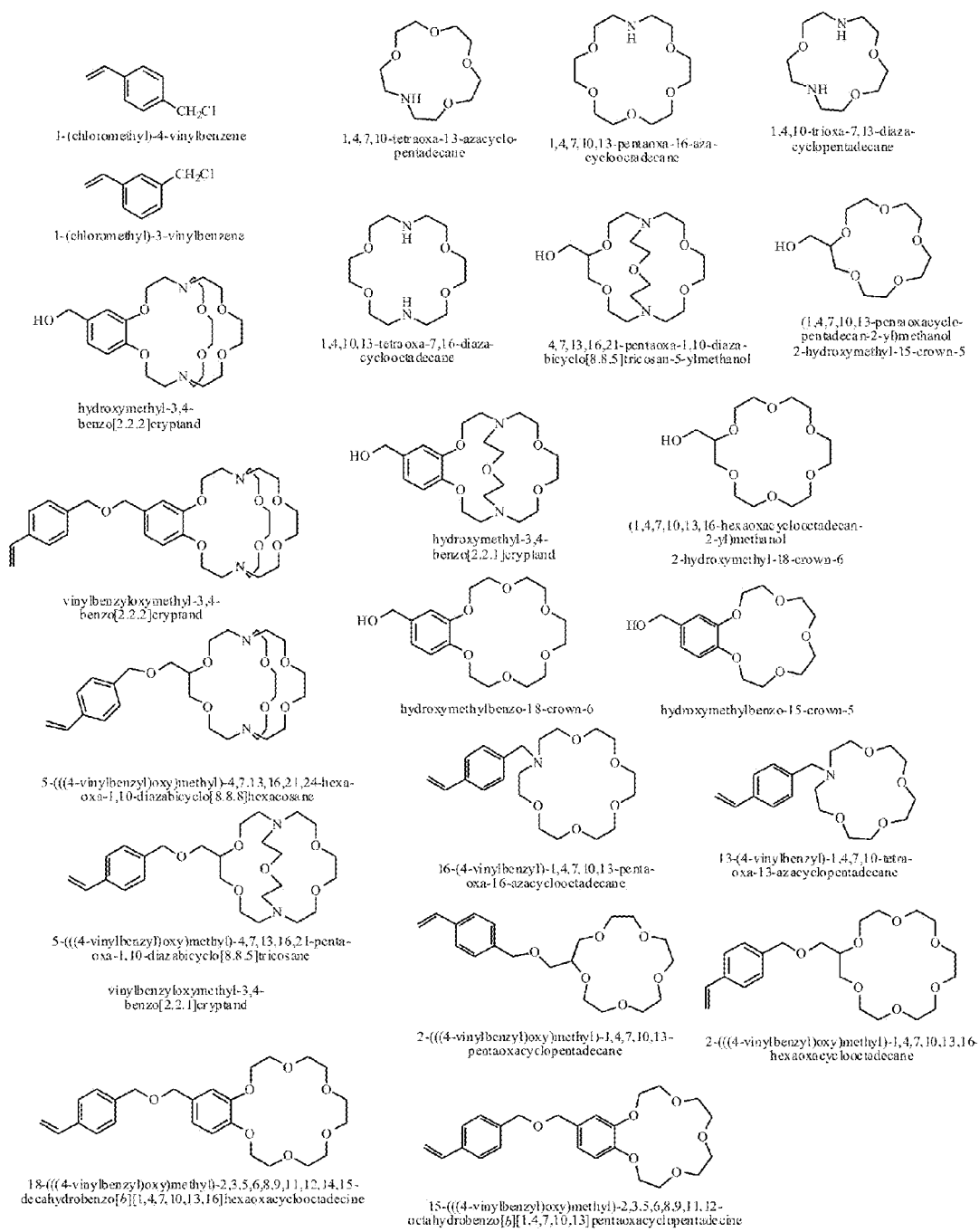
FIG. 4 provides components used in the preparation of cyclic polyethers (including isomers, such as meta- and para-)
Figure 5:
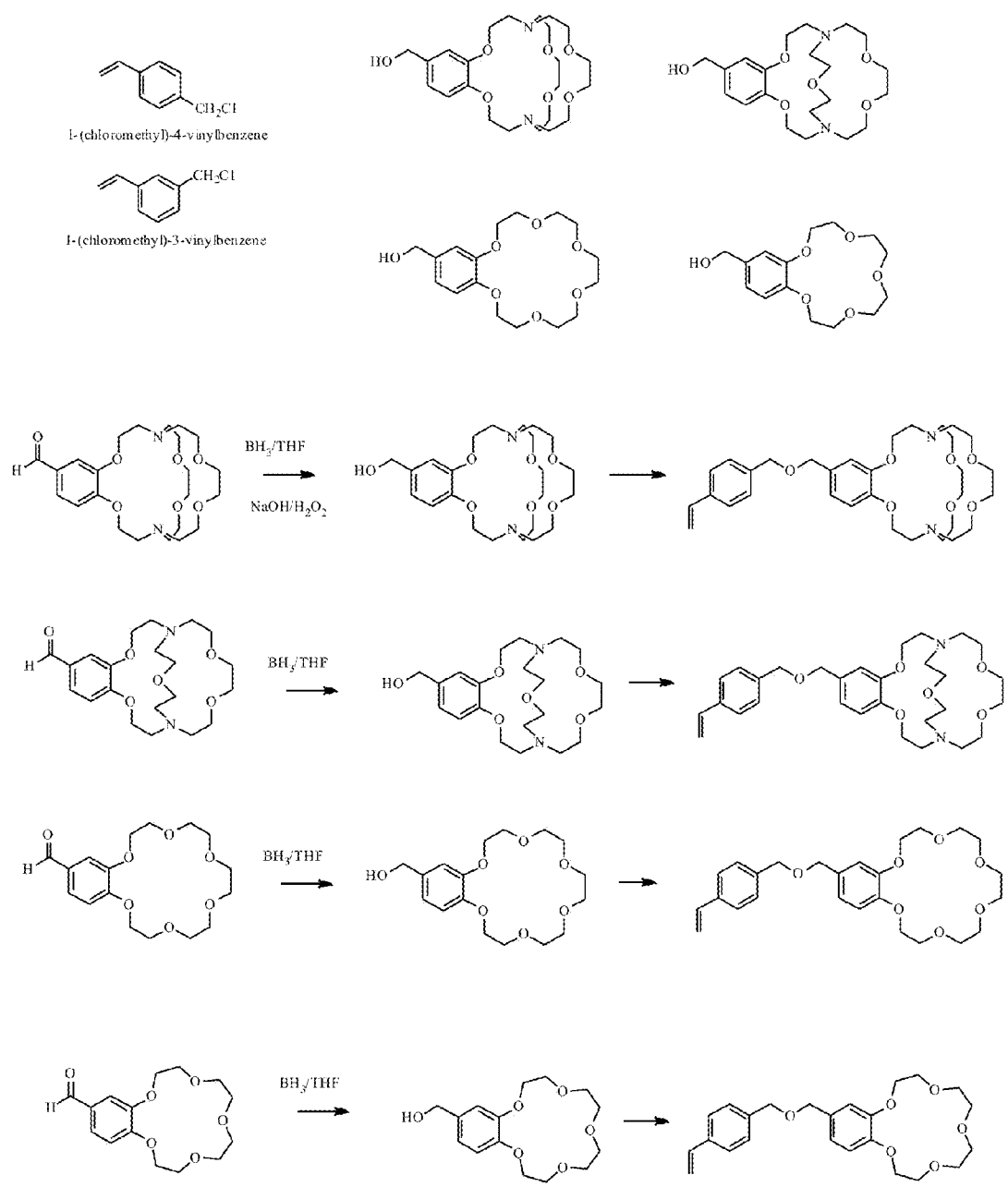
FIG. 5 provides components and reactions used in the preparation of cyclic polyethers (including isomers, such as meta- and para-)
Figure 6:
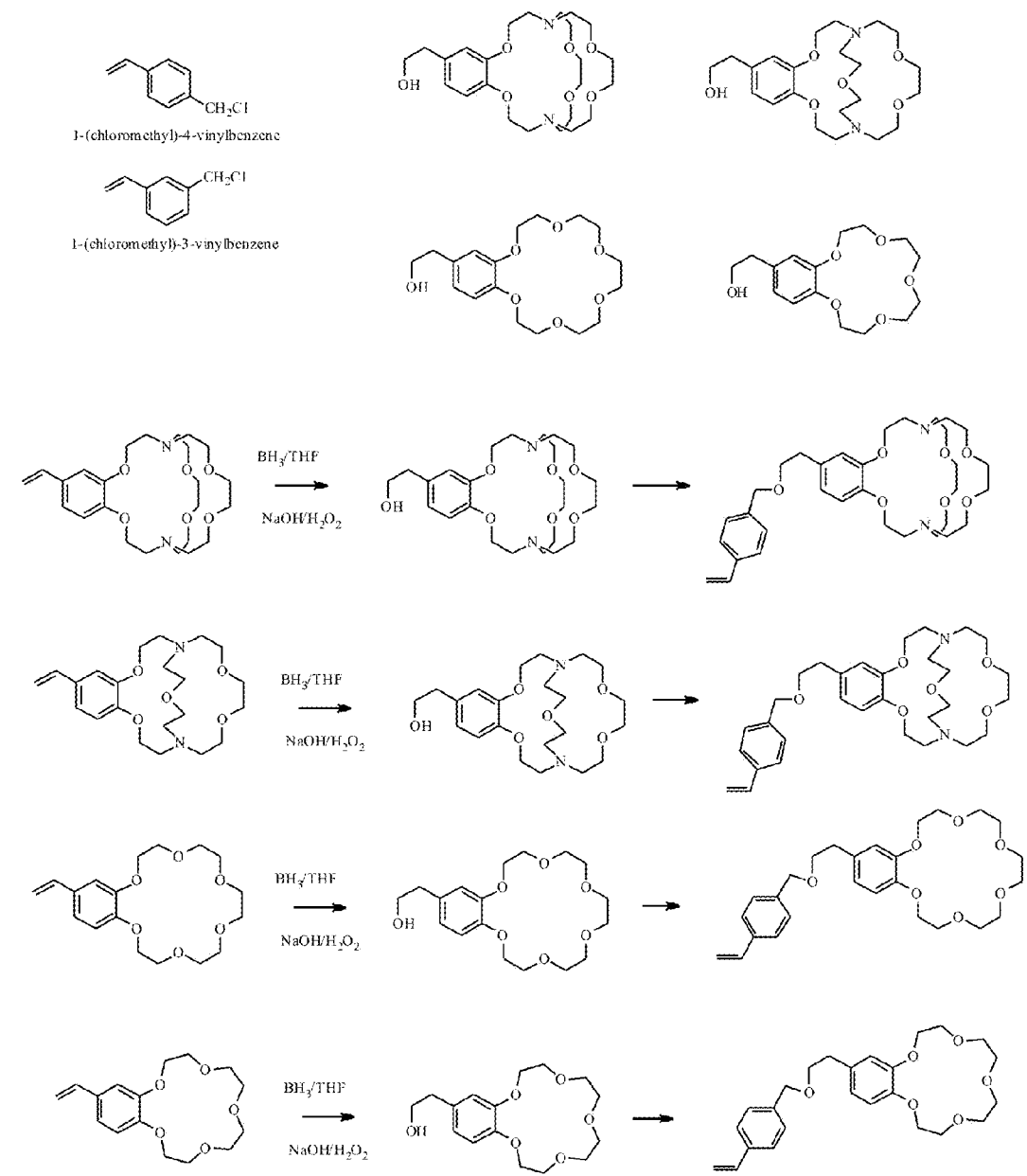
FIG. 6 provides components and reactions used in the preparation of cyclic polyethers (including isomers, such as meta- and para-)

Vinyl benzo[2.2.2]cryptand and vinyl[2.2.1]cryptand were prepared as shown in FIGS. 2 and 3. The new vinylbenzo[2.2.2]cryptand (compound 36) and vinylbenzo[2.2.1] cryptand (compound 37) polymerize by radicals in emulsions. However, any known vinyl polymerization method is also possible including anionic, free radical and controlled free radical polymerization methods such as RAFT, nitroxyl mediated free radical, ATRP, and the like.

(37)

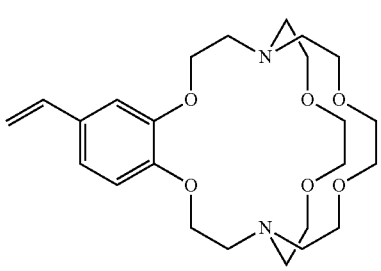

-continued (38)

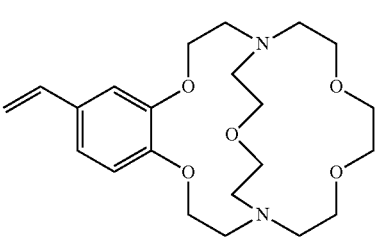

The preparation of vinylbenzo[2.2.2]cryptand and vinylbenzo[2.2.1]cryptand from 4-acetylcresol follows a similar pathways as that in Kopolow et al and FIG. 3.

(39)

Compounds with hydroxyl groups are allowed to react with vinylbenzyl chloride and then polymerized in emulsion, or alternatively, are allowed to react with poly(11-undecylenyl iodide) in tetrahydrofuran with sodium hydride to prepare polymers with pendant crown ethers and cryptands. (see FIGS. 4 to 8)

Each of the vinylbenzl compounds such as compounds 34, 35, 36, and 37 are polymerized in emulsion with crosslinking dimers such as divinylbenzene or compound to form nanoparticulate beads which are further purified by dialysis. These polymers are then added to ionomers to scavenge metal ions before the coating of polyelectrolyte membranes.

Figure 7:
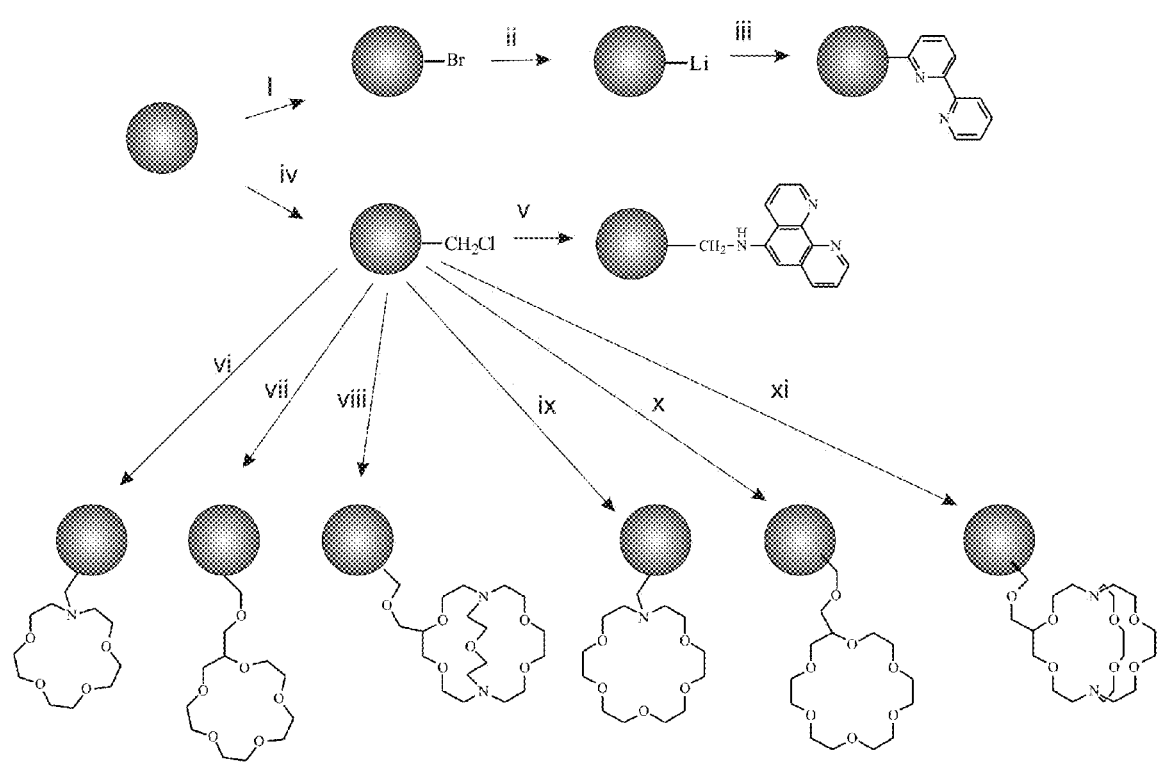
FIG. 7 provides a synthetic pathway for cyclic polyether compounds with the following: (i) $B_{r2}$/Fe/$C_{H2}C_{12}$; (ii) n-butyllithium/THF, $-3^{oo}$ C.; (iii) bipyridine; (iv) dimethoxymethane, acetyl chloride, methanol, and $SnC_{14}$ in $C_{H2}C_{12}$; (v) ortho-phenanthroline-4-amine; (vi) 1-aza-15-crown-5 in THF; (vii) 2-hydroxymethyl-15-crown-5 in THF with NaH; (viii) 2-hydroxymethyl[2.2.1]cryptand in THF with NaH; (ix) 1-aza-18-crown-6 in THF; (x) 2-hydroxymethyl-18-crown-6 in THF with NaH; (xi) 2-hydroxymethyl[2.2.2]cryptand in THF with NaH.

Polystyrene crosslinked with divinylbenzene in the form of beads, fibers, particulates and nanoparticles are functionalized with metal ionophores as shown in FIG. 7. These materials are used as additives in polyelectrolyte membranes.

Figure 8:
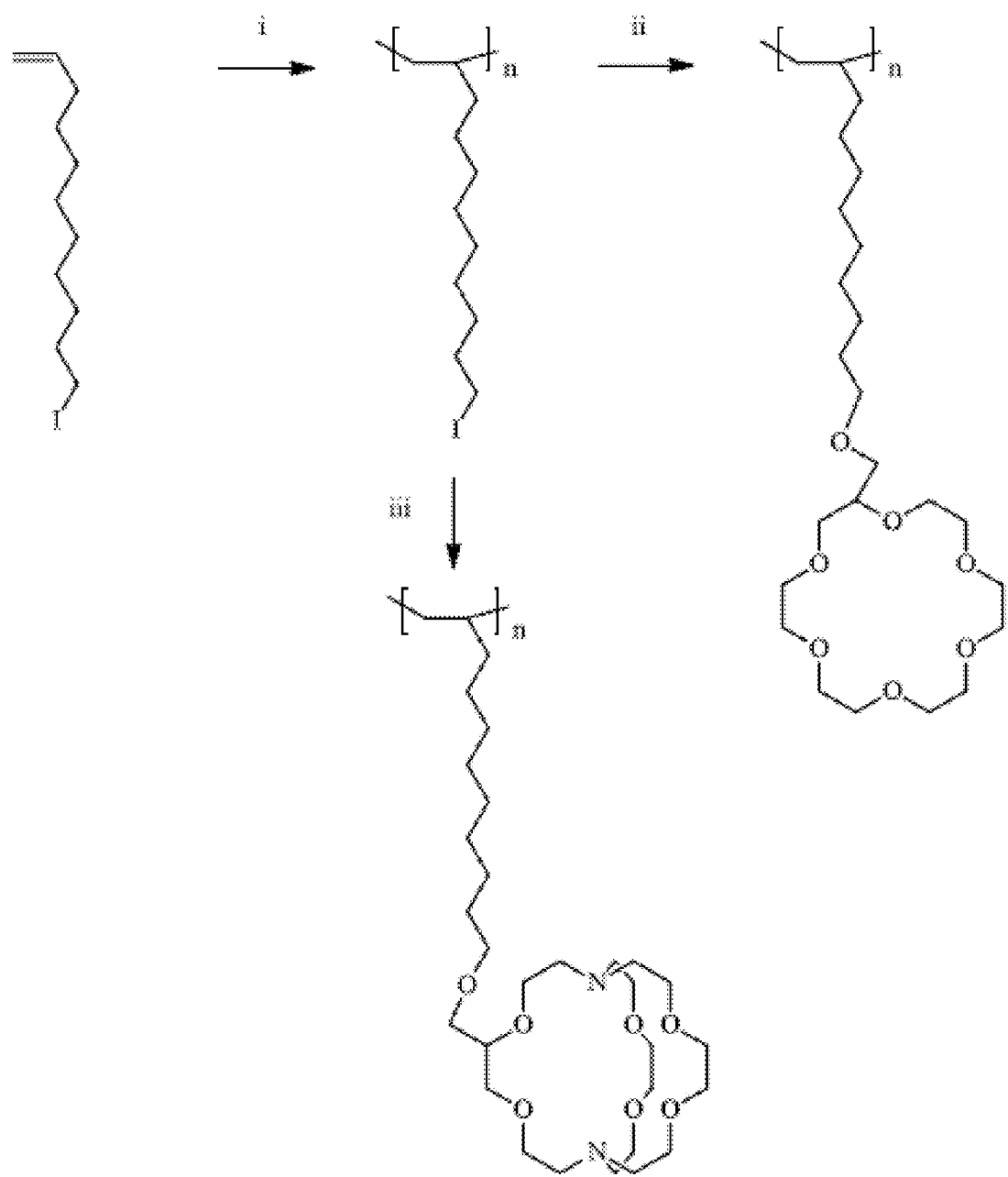
FIG. 8 provides a synthetic pathway for cyclic polyether compounds with the following: (i) $TiCl_3 \cdot AA$/diethylaluminum chloride in toluene; (ii) 2-hydroxymethyl-18-crown-6 in THF with NaH; (iii) 2-hydroxymethyl[2.2.2]cryptand in THF with NaH; [Note: the other hydroxy-substituted ionophores (like those listed on the top in FIG. 4) are also possible; these might include (ii) 2-hydroxy-15-crown-5 in THF with NaH; same with (iii) 2-hydroxymethyl[2.2.1] cryptand in THF with NaH.

Polyolefins are prepared by the Ziegler-Natta polymerization of 1-olefins and the polymerization proceeds with a variety of functional groups in FIG. 8. In this variation, undecylenyl iodide is polymerized and then the iodo group is replaced with ionophoric groups. These materials are added to ionomer coating solutions to form fuel cell membranes.

4'-HC(O) $C_6H_3(OCH_2COOH)(OCH_2COOH)$ (Compound 40). Under argon, $ClCH_2COOH$ (23.6 g, 0.25 mol) in t-BuOH (80 mL) is added slowly to a refluxing mixture of 1-HC(O)-3,4-$C_6H_3(OH)_2$, (13.8 g, 0.1 mol) and $K^{+-}OBu$-t (56.1 g, 0.5 mol) in t-BuOH (400 mL). The mixture is refluxed and stirred for 4 h and then stirred at 23° C. for 6 h. The t-BuOH is evaporated under vacuum, and then $H_2O$ (100 mL) is added. After extraction with Et$_2$O, the aqueous layer is acidified with HCl and is repeatedly extracted with CH$_2$Cl$_2$. The combined CH$_2$Cl$_2$ solutions are centrifuged, filtered and evaporated under vacuum to yield 4'-HC(O)—C$_6$H$_3$(OCH$_2$COOH)(OCH$_2$COOH (compound 40, 10 g).

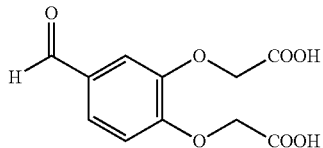

(40)

Compound 41. Compound 1 (10 g) is dissolved in 400 mL of a 1:1 volume mixture of benzene and methanol, and then p-toluenesulfonic acid (2 g) is added. The mixture is heated to reflux for 16 h with continuous circulation of condensed vapors through anhydrous Na$_2$SO$_4$ in a thimble of a Soxhlet extractor. The solvent is removed and an ether solution of the residue is washed with 5% aqueous NaHCO$_3$. The ether layer is dried over Na$_2$SO$_4$ and then removed to yield compound 41 (10 g).

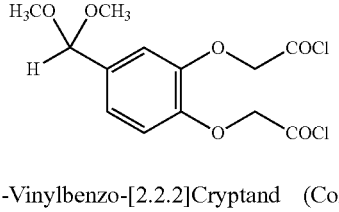

(41)

Compound 42. The diazacrown ether, 1,4,10,13-tetraoxa-7,16-diazacyclooctadecane (1 eq) in dry THF (50 mL) is treated with two equivalents of n-butyllithium (1.6 M in hexanes) and is added dropwise to compound 41 (0.5 eq) in THF (50 mL) with magnetic stirring. After stirring 16 h at 23° C., the mixture is stirred at reflux for 8 h. Removal of the solvent yielded the cryptand diamide. Reduction with LiAlH$_4$ in THF, followed by acid hydrolysis, and then reaction with LiCH$_2$P(C$_6$H$_5$)$_3$ in ether produces compound 42:

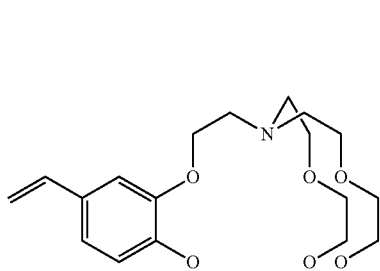

(42)

Compound 43. A 50 wt. % solution of aqueous sodium hydroxide (5 mL) is added dropwise to a stirred solution of 5 g of compound 41 in methanol while keeping the temperature at less than 40° C. The mixture is left at 23° C. for 4 h, extracted with 100 mL ether, and acidified with dilute hydrochloric acid. After repeated extraction with CH$_2$Cl$_2$, drying of the combined organic layers over Na$_2$SO$_4$, filtration and evaporation, the diacid is obtained. The diacid (0.906 mmol) is dissolved in 20 mL of dry benzene and oxalyl chloride (10.7 g, 84 mmol) is added all at once. A small amount of pyridine (3 drops) is added as a catalyst which causes an immediate reaction. The flask is fitted with a drying tube and stirred for 48 h at 23° C. The mixture is then quickly filtered under nitrogen through a dry sintered glass Schlenk funnel, the solvent is evaporated in vacuo, and then co-evaporated once with dry benzene. The residue compound 43 is stirred under vacuum for 30 minutes and then used immediately after it is produced.

43

4'-Vinylbenzo-[2.2.2]Cryptand (Compound 44). The diazacrown ether, 1,4,10,13-tetraoxa-7,16-diazacyclooctadecane, and triethylamine (2.50 g, 24.7 mmol) diluted to 110 mL in toluene and the diacid chloride compound 2 (9.2 mmole) diluted to 110 mL in toluene are added simultaneously to 350 mL of toluene, with vigorous stirring at 0-5° C. in a Morton flask over a period of 7-8 h. After the addition is completed, the mixture is stirred overnight at 23° C. The solid precipitate is filtered and washed with toluene and then Et$_2$O. The filtrate is combined with the washings and evaporated in vacuo, and the residue is subjected to chromatography on alumina using EtOAc/MeOH (40:1) as eluent to give the cryptand diamide. To a solution of the cryptand diamide (5.4 mmol) stirring at 23° C. in 10 mL dry THF is added dropwise a 1.0 M solution of BH$_3$.Me$_2$S complex (20 mL) in THF and the mixture is stirred at reflux for 9 h. The solution is cooled to 23° C., then cooled in an ice bath, and water (5 mL) is added slowly to destroy the excess BH$_3$. The solution is evaporated in vacuo and the remaining solid is refluxed in a mixture of water (10 mL) and 6 N HCl (15 min) for 12 h. After cooling the solution to 23° C., 50 wt. % NaOH is added slowly with stirring to adjust the pH to 10 and the solution is evaporated in vacuo. The resulting precipitate is washed with 2×30 mL of MeOH. The washings are combined after filtration and Et$_2$O is added to precipitate the inorganic salts by adding a small amount of Et$_2$O, filtering the solution, collecting the filtrate and then adding more Et$_2$O. This is done repeatedly, evaporating some solution to reduce the volume needed, until no more solid precipitated from solution. The filtrate is evaporated in vacuo and the residue is purified by chromatography on alumina using CHCl$_3$/MeOH (25:1) as eluent to give 4'-formylbenzo-[2.2.2]cryptand. Alternatively, the cyclic diamide in THF (20 mL) is added at 23° C. to a stirred suspension of LiAlH$_4$ in THF (20 mL). The solution is stirred at reflux for 24 h, cooled to 23° C. and then to 0° C. with an ice bath. A solution of 15% NaOH (2 mL) is added and the suspension is stirred 24 h. After filtration and solvent evaporation, the residue is subjected to chromatography on alumina using CHCl$_3$ and ethanol (25:1) as eluent to give the cryptand. Using a gas-tight syringe, 1.2 mL of a 1.6 M solution of n-butyllithim in hexanes is added to methyltriphenylphosphonium bromide (2.11 g) in dry ether (100 mL) under argon with magnetic stirring. The yellow mixture is boiled at reflux under argon for 1 hour, and 4'-formylbenzo-[2.2.2]cryptand (1.2 g) in dry ether (50 mL) is added dropwise. Boiling at reflux is continued for 1 h and then the reaction is stirred 48 h at 23° C. The solution is filtered and the ether layer is filtered through a plug of Merck silica in a column eluting with ether. After a second filtration through a plug of silica with ether, the ether is removed and 4'-vinylbenzo-[2.2.2]cryptand, (1 g) is obtained.

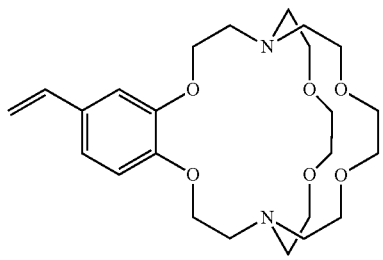

(44)

Preparation of [4'-HC(O)C$_4$H$_3$(O—)$_2$(CH$_2$CH$_2$OCH$_2$CH$_2$OCH$_2$CH$_2$)] (Compound 45) and Compound 46. To 1-L of t-butanol is added 1-HC(O)C$_4$H$_3$(OH)$_2$ (0.2 mol, 27.6 g) and the mixture is purged 0.5 h under N$_2$. A solution of K$^{+-}$OBu-t (46 g, 0.41 mol) is added in t-BuOH (328 mL), and then (ClCH$_2$CH$_2$OCH$_2$CH$_2$)$_2$O (46.2 g, 0.2 mol) is added over 15 minutes. The reaction mixture is then refluxed 24 hours. The mixture is cooled, and the solvent is removed using a rotary evaporator. Water is added and the mixture is extracted multiple times with CH$_2$Cl$_2$, the combined organic layers are dried over sodium sulfate, filtered and then the solvent is evaporated. The residue is extracted multiple times with ether (0.5 L each) to yield 20 g of [4'-HC(O)C$_4$H$_3$(O)$_2$(CH$_2$CH$_2$OCH$_2$CH$_2$OCH$_2$CH$_2$)], 4'-formylbenzo-15-crown-5 (compound 45), and compound 46.

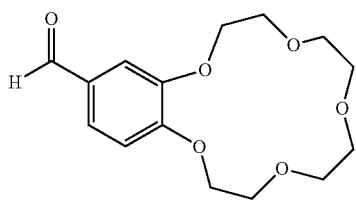

(45)

(46)

Preparation of [4'-HC(O)C$_4$H$_3$(O—)$_2$(CH$_2$CH$_2$OCH$_2$CH$_2$OCH$_2$CH$_2$)] (Compound 45) and Compound 46. To 1-L of t-butanol is added 1-HC(O)C$_4$H$_3$(OH)$_2$ (0.2 mol, 27.6 g) and the mixture is purged 0.5 h under N$_2$. A solution of K$^{+-}$OBu-t (46 g, 0.41 mol) is added in t-BuOH (328 mL), and then (ClCH$_2$CH$_2$OCH$_2$CH$_2$)$_2$O (46.2 g, 0.2 mol) is added over 15 minutes. The reaction mixture is then refluxed 60 hours at 70° C. The mixture is cooled, and the solvent is removed using a rotary evaporator. The residue is washed with hexanes to remove residual unreacted ether and then is washed diethyl ether. Aqueous 10 wt. % hydrochloric acid (100 mL) is added and the mixture is extracted multiple times with CH$_2$Cl$_2$. The combined organic layers are separated with the aid of a centrifuge and then dried over sodium sulfate, filtered and then the solvent is evaporated. The residue is extracted multiple times with ether (0.5 to 1 g of 45 dissolves in 1 L of ether) to yield 9.66 g of recrystallized [4'-HC(O)C$_4$H$_3$(O)$_2$(CH$_2$CH$_2$OCH$_2$CH$_2$OCH$_2$CH$_2$)], 4'-formylbenzo-15-crown-5 (compound 45), and compound 46 (1.256 g).

Preparation of 6,7,9,10,12,13,15,16,23,24,26,27,29,30,32,33-hexadecahydrodibenzo-[b,q][1,4,7,10,13,16,19,22,25,28]decaoxacyclotriacontine-2,20-dicarbaldehyde (Compound 47). The methyl Grignard is made by adding MeI (17.5 g) and dry ether (50 mL) to 3 g Mg in dry ether (20 mL). After the Mg dissolves, 7 g of compound 46 in 400 mL of dry ether/100 mL of dry benzene are added dropwise. A white precipitate forms immediately. After complete addition, the mixture is heated 1 h at reflux, then cooled, and 15% aq NH$_4$Cl solution is added until two layers form. The aqueous layer is extracted 4 times with 100 mL CHCl$_3$. The Et$_2$O and CHCl$_3$ layers are combined and dried. The residue is recrystallized from 500 mL ether to give 5 g of compound 47:

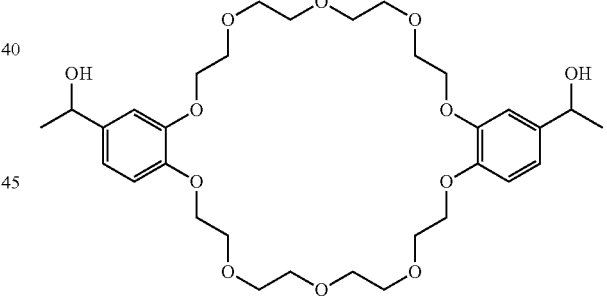

(47)

2,20-divinyl-6,7,9,10,12,13,15,16,23,24,26,27,29,30,32,33-hexadecahydrodibenzo[b,q][1,4,7,10,13,16,19,22,25,28]decaoxacyclotriacontine (Compound 48). A trace of p-toluenesulfonic acid monohydrate is added to 4 g compound 47 in 350 mL benzene. The mixture is refluxed with removal of H$_2$O for 14 h. After cooling to 23° C., 5 drops of pyridine are added. Benzene is evaporated and the product crystallizes on standing. Compound 48 is dissolved in 100-mL CH$_2$Cl$_2$, extracted 4 times with 100-mL H$_2$O, and then the CH$_2$Cl$_2$ is dried over Na$_2$SO$_4$. The CH$_2$Cl$_2$ is removed, and the residue recrystallizes from petroleum ether (1 g of compound 48 in 75 mL) to give 3 g of compound 48:

(48)

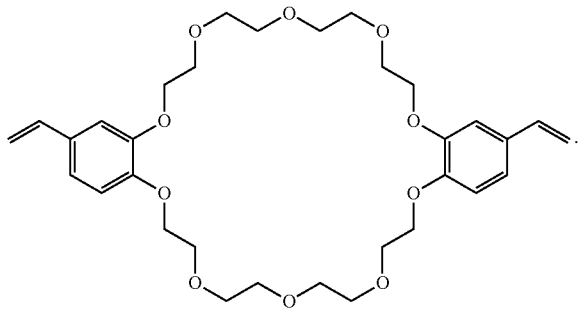

Preparation of Undecylenyl iodide. To a 250-mL round-bottom flask with mechanical stirrer, reflux condenser and addition funnel are added NaI (43.5 g, 0.29 mol) and acetone (75 mL). Undecylenyl chloride (43 g, 0.2226 mol) is added dropwise and the mixture is refluxed for 16 h. More NaI (9 g) is then added and boiling at reflux is continued for 4 days. $CH_2Cl_2$ is added, and the reaction mixture is filtered. The solvent is removed and the residue is vacuum distilled. The fraction collected between 95-98° C. at 1 mm Hg is 11-iododoundecene.

Preparation of Poly(11-undecvlenyl iodide). Undecylenyl iodide (5 g), toluene (30 g), $Et_2AlCl$ (10 mL of a 1.8 M solution), $TiCl_3.AA$ (0.5 teaspoon, ≈2 g, Aldrich), and 16 h at 25° C. are combined. After 16 h, the mixture is blended with methanol, and the filtered polymer is washed with water and then methanol. Other ratios used include: undecylenyl iodide (12 g), toluene (40 g), $Et_2AlCl$ (22 mL of a 1.8 M solution), $TiCl_3.AA$ (1 teaspoon), and then 16 h at 25° C.

Reaction of Cryptand (Compound 49) and Poly(11-undeclenyl iodide). Freshly distilled tetrahydrofuran (100 mL) and about 60 wt. % sodium hydride in mineral oil (6 g) is added to poly(11-undecylenyl iodide) (1 g). With magnetic stirring under argon, compound 33 (2 g) is added and the mixture is stirred at 23° C. for 7 days. Isopropanol is added cautiously to quench the remaining sodium hydride. The reaction mixture is concentrated using a rotary evaporator and then is added to water (100 mL). The mixture is centrifuged and the solids are washed with water and centrifuged.

(49)

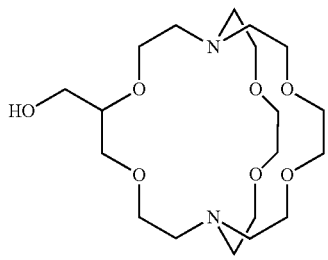

Reaction of 2-Hydroxymethyl-18-crown-6 and Poly(11-undecylenyl iodide). Freshly distilled tetrahydrofuran (100 mL) and about 60 wt. % sodium hydride in mineral oil (6 g) is added to poly(11-undecylenyl iodide) (1 g). With magnetic stirring under argon, 2-hydroxymethyl-18-crown-6 (2 g) is added and the mixture is stirred at 23° C. for 7 days. Isopropanol is added cautiously to quench the remaining sodium hydride. The reaction mixture is concentrated using a rotary evaporator and then is added to water (100 mL). The mixture is centrifuged and the solids are washed with water and centrifuged. Increasing the reaction temperature turns the resultant polymer brown without further increasing the replacement of iodide by the 2-hydrorxymethyl-18-crown-6, as determined with infrared spectroscopy.

Polymerization of 4'-Vinylbenzo-[2.2.2]Cryptand (Compound 50) or Compound 51. De-ionized water, ammonium persulfate (0.5 mg), sodium hydrogen phosphate (0.5 mg), sodium lauryl sulfate (0.01 g), 4'-vinylbenzo-[2.2.2]cryptand (0.5 g) and divinylbenzene (0.01 g) (compound 50) or compound 51 (0.01 g) are added to a 250-mL, 3-neck, flask equipped with a stir bar, reflux condenser, and argon inlet. The flask is situated in an oil bath, and the mixture is purged for 15 minutes with argon. The purged mixture is then heated at 70° C. for 2 h under argon with stirring. The reaction temperature is increased and is maintained at less than 80° C. for about 16 h. The mixture at 23° C. is transferred to a dialysis tube (Spectropore) and is dialyzed against 4 liters of water with two changes per day for 7 days. The milky dispersion is concentrated using a rotary evaporator and dry particles of polymer are obtained by freeze drying the dispersion.

(50)

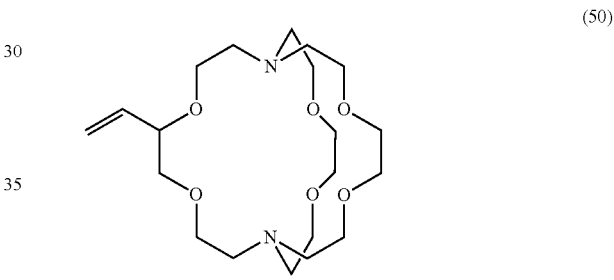

(51)

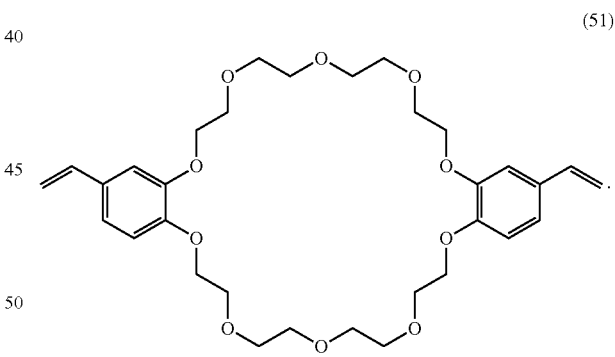

Reaction of 2-Hydroxymethyl-15-Crown-5 and Vinylbenzyl Chloride. Vinylbenzyl chloride (1.4 g, 0.009173 mol) in 45 g of freshly distilled, dry THF with excess 60 wt. % sodium hydride in oil (1.73 g) are magnetically stirred and 2-hydroxymethyl-15-crown-5 (1.432 g, 0.005721 mol) is added in a minimal amount of THF (5 mL). The reaction vessel is stoppered and the reaction mixture is then stirred at 23° C. for 16 h. A portion of the reaction is pressure filtered through a 5 micrometer Mitex filter (Millipore) and the solvent is then removed from the filtrate. The residue when analyzed using gc/ms analysis identifies the product as 2-(((4-vinylbenzyl)oxy)methyl)-1,4,7,10,13-pentaoxacyclopentadecane compound 52:

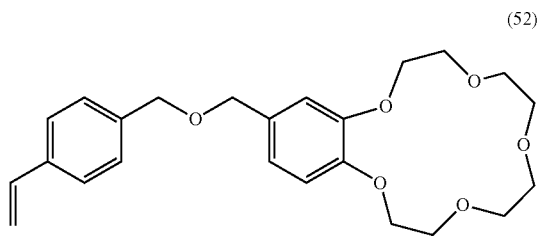 [SMILES: C=Cc1ccc(COCc2ccc3c(c2)OCCOCCOCCOCCO3)cc1]

(52)

which also contains some unreacted vinylbenzyl chloride. About 20 mL of water is added and the mixture is extracted with 100 mL of hexanes. The hexanes layer contained about 1.48 grams of oil and the compound shown below and unreacted vinylbenzyl chloride. Distillation of this mixture produces oil and vinylbenzyl chloride in the volatile portion. The residue polymerizes. The aqueous layer is extracted with 100 mL of the following solvents which on drying yields compound 53:

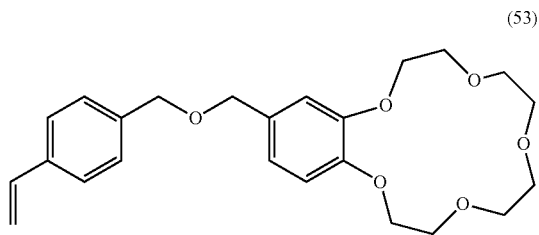 [SMILES: C=Cc1ccc(COCc2ccc3c(c2)OCCOCCOCCOCCO3)cc1]

(53)

in the amounts specified in parentheses: toluene (0.49 g), ether (0.19 g), and methylene chloride (0.213 g). The aqueous residue contains 0.014 g in emulsion. The polymer that forms during distillation at 80° C. contains 1.5 wt. % chlorine and consists of large (100 to 500 micrometer) flat flakes.

Polymerization of Compound 2-(((4-vinylbenzyl)oxy) methyl)-1,4,7,10,13-penta-oxacyclopentadecane (63 wt. %), Compound 53, with Styrene. The 2-(((4-vinylbenzyl)oxy) methyl)-1,4,7,10,13-pentaoxacyclopentadecane (compound 53, 0.907 g, 0.003085 mol) is dissolved in distilled styrene monomer (0.533 g, 0.005125 mol) and divinylbenzene (0.1 g) is added. This monomer is added to a mixture of potassium persulfate (0.01 g), sodium hydrogen phosphate (0.01 g) and sodium dodecylsulfate (0.1 g) in 20 mL of deionized water in a beverage bottle (6.5 fluid ounce volume) equipped with a rubber septum and a magnetic stir bar. The emulsion is sparged with argon for 30 minutes and is then heated at 70° C. for 24 hours. After cooling, the contents of the bottle are transferred to Spectropore dialysis tubing and dialyzed for 1 week against 4-liters of deionized water with water changes occurring at least twice per day. The residue is freeze dried to yield 1 gram of particles as shown in the following figure. The polymer is 63 wt. % (37.6 mol. %) crown ether, and the remainder is attributed to styrene moieties. After sieving of the powder, particles of less than 10 microns in dimension are obtained.

Polymerization of 4'-Vinylbenzo-18-Crown-6. The compound 4'-vinylbenzo-18-crown-6 (3 g) and divinylbenzene (0.1 g) are added to a mixture of potassium persulfate (0.02 g), sodium hydrogen phosphate (0.02 g) and sodium dodecylsulfate (0.2 g) in 40 mL of deionized water in a beverage bottle (6.5 fluid ounce volume) equipped with a rubber septum and a magnetic stir bar. The emulsion is sparged with argon for 30 minutes and is then heated at 70° C. for 48 hours. After cooling, the contents of the bottle are transferred to Spectropore dialysis tubing and dialyzed for 1 week against 4-liters of deionized water with water changes occurring at least twice per day. The residue is freeze dried to yield 3 gram of fibers.

Emulsion Polymerization of Styrene and Divinylbenzene with Persulfate. In a soda pop bottle (6.5 fluid ounces) is placed 100 g water, 0.05 g potassium persulfate, 0.05 g sodium hydrogen phosphate, and 1 g sodium laurylsulfate. When this mixture dissolved, a mixture of styrene (25 g) and 3% divinylbenzene (DVB 0.77 g) is added. Nitrogen is bubbled through the mixture to replace the air and disperse the reactants. The nitrogen tube is removed and the bottle is capped and sealed, and the mixture is stirred at 70° C. for 2 h, then 95° C. for 2 h. The latex is transferred to a dialysis tube and dialyzed for 1 week with frequent water changes. After freeze-drying 24.2 g of product was obtained with an average particle size of 133 nanometers.

Emulsion Polymerization of Styrene and 10 wt. % Divinylbenzene with Persulfate. In a 3-necked, 500-mL, round-bottom flask equipped with a mechanical stirrer, condenser and argon inlet is placed 100 g water, 0.1 g potassium persulfate, 0.1 g sodium hydrogen phosphate, and 1 g sodium dodecylsulfate. When this mixture dissolved, a mixture of 25 g styrene and (2.78 g) of divinylbenzene (for 10 wt. % cross-linking) is added. After 30 minutes at 23° C., the mixture is stirred at 40° C. for 64 h and then at 60° C. for 4 h, and then at 70° C. for 16 h. The latex is transferred to a dialysis tube and dialyzed for 1 week with frequent water changes. The average particle size is about 95.8 nm in diameter.

Reaction of Vinylbenzyl Chloride (75% Mixture of 3- and 4-isomers) and 1-Aza-15-Crown-5 (Compound 54) to Make Compound 55. Vinylbenzyl chloride (0.640 g, 0.00456 mol) in dry tetrahydrofuran (8.36 g) is roll milled in a 25-mL Wheaton jar (having a polyolefin screw cap) with 1-aza-15-crown-5 (1.236 g, 0.005637 mol) dissolved in tetrahydrofuran (9 g). The clear, water white solutions immediately turn yellow when combined. After roll milling for 24 hours, more 1-aza-15-crown-5 (1 g) is added and roll-milling is maintained for another 24 hours. The solvent is removed and the residue consists of an oil [hexanes soluble fraction consisting of 11.7% vinylbenzyl chloride and 88.3% 13-(4-vinylbenzyl)-1,4,7,10-tetraoxa-13-azacyclopentadecane with 8.6% unreacted 1-aza-15-crown-5 of the total mixture] and white crystals (hexanes insoluble fraction consisting of 3% vinylbenzyl chloride and 95.1% 13-(4-vinylbenzyl)-1,4,7,10-tetraoxa-13-azacyclopentadecane. There is a 1:1 mixture of unreacted 1-aza-15-crown-5 to the protonated 1-aza-15-crown-5 form, each consisting of 19.5% of the total mixture). The mixture is polymerized in an emulsion with divinylbenzene. The two fractions are dissolved in 40 mL of water and 1 gram of sodium dodecylsulfate, 0.1 g of potassium persulfate and 0.1 g of sodium hydrogen phosphate are added. Polymerization is carried out for 1 day at 40° C. and 1 day at 60° C. The liquid (emulsion) is dialyzed against 4 liters of water for 1 week with frequent water changes and then the light-yellow polymer emulsion is then freeze-dried to yield particles of poly[13-(4-vinylbenzyl)-1,4,7,10-tetraoxa-13-azacyclopentadecane] and its meta-isomer.

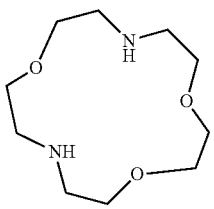

1,4,10-trioxa-7,13-diaza-cyclopentadecane (54)

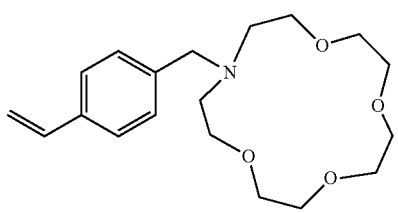

13-(4-vinylbenzyl)-1,4,7,10-tetraoxa-13-azacyclopentadecane (55)

Chloromethylation of Emulsion Polymerized Styrene-Divinylbenzene Particles. A solution of chloromethyl ether in methyl acetate is made by adding acetyl chloride (31.1 mL) to a mixture of dimethoxymethane (44 mL) and methanol (10 mL) to a 500-mL, 3-neck flask situated in an oil bath and equipped with a condenser, mechanical stirrer, argon inlet and addition funnel. To this mixture is added dichloromethane (130 mL). To the addition funnel equipped with a rubber septum and containing 20 mL of dichloromethane is added via syringe, tin tetrachloride (0.5 mL), and this solution is added dropwise to the reaction mixture at a slow enough rate to control the sudden, vigorous reflux that occurs soon after a portion of the tin tetrachloroide is added. After the addition is complete and refluxing subsides, the styrene-divinyl benzene particles (5 g) are added all at once with vigorous stirring. Dichloromethane (40 mL) is used to complete the transfer of the particles to the reaction mixture. A homogenizer (IKA Turrax T25) is used to completely disperse the particles in the reaction mixture. Then the oil bath temperature is increased to 50° C. and boiling at reflux with stirring is maintained for 18 hours. After cooling to 23° C., methanol (about 50 mL) is added via a squirt bottle until the mixture turns from red to colorless. The solvent is partly removed using a rotary evaporator until a solid coagulates with the consistency of taffy. The solid is blended with 250 mL of methanol using a Waring blender with Variac to control the stirring speed, and the particulates are filtered, washed with methanol and dried. The wt. % Cl is between 4.4 and 4.6 (ca 5%). The mass increase in the product compared with starting material is consistent with 7% Cl. This corresponds to about 1 chloromethyl group per 7 styrene groups (calculated at 4.57%). The yield of product is 4.98 g.

Reaction of Chloromethylated Polystyrene-Divinylbenzene Particles with 2-Hydroxymethyl-15-crown-5. Some of the chloromethylated particles (1 g) are suspended in dry tetrahydrofuran (100 mL) with 50 wt. % sodium hydride in oil and 2-hydroxymethyl-15-crown-5 (1 g) is added. The mixture is magnetically stirred under argon for 3 days at 23° C., and then methanol is cautiously added. After the sodium hydride is consumed, the particles are isolated by filtration, washed with methanol and dried. The particles have crown ethers attached. One gram of polystyrene-divinylbenzene with 1 chloromethyl group per 6 styrene groups requires 0.37 g of hydroxymethyl-15-crown-5. By comparison, replacement of the chloromethyl groups with 1-aza-15-crown-5 requires 0.33 g at 1 mol/1 mol or 0.66 g at 2 mol of 1-aza-15-crown-5 per mol of chloromethyl groups.

Bromination of et Emulsion Polymerized Styrene-Divinylbenzene Particles. To dichloromethane (100 mL) in a 120-mL screw cap jar with a Teflon lid liner is added styrene-divinylbenzene particles (5 g), iron particles (10 micrometer or less, 0.518 g), a stir bar and bromine (7.68 g). The mixture is vigorously shaken and then placed on a roll mill. Within 30 minutes, the red solution becomes a jelled mass. The mixture is allowed to roll mill for 18 hours and then is chopped in a Waring blender with 250 mL of water. The polymer is collected and washed with methanol (two× 250 mL) using the Waring blender, isolated by filtration and rinsed with more methanol. The particles are then suspended and stirred for 2 hours in a jar with 90 mL of water and 10 mL of concentrated hydrochloric acid. The particles are filtered, washed with water (3 liters) and then with methanol (two times 200 mL). After isolation by filtration and drying, white particles are obtained. The % Br ranges between 32 and 35 wt. %. At 1 Br per each styrene group the calculated % Br is 44 wt. % and for 1 Br per two styrene groups, the calculated wt. % Br is 27.8. The yield of product is 7.398 g.

Lithiation of Brominated Styrene-Divinylbenzene Particles and Reaction with 2,2'-Bipyridyl. Some of the brominated particles (1 g) are suspended in dry tetrahydrofuran in a Schlenk flask under argon equipped with a rubber septum and argon inlet. After cooling to −30° C. with an isopropanol-liquid nitrogen bath, n-butyllithium (3.5 mL of a 1.6 molar solution in hexanes) is added. The reaction mixture is allowed to stir for 30 minutes and then 2,2'-bipyridyl (1 g) in a minimal amount of tetrahydrofuran is added. The reaction mixture is allowed to stir for 16 hours at 23° C., and then air is bubbled into the reaction mixture until a color change is observed within two hours. The gold particles have 2,2-bipyridyl groups attached, presumably through the 2-position ortho- to the pyridyl N.

Membrane Casting Procedure. The particles at between 5 and 15 wt. % loading based on ionomer solids are added to a solution of NAFION™ in aqueous 1-propanol at 20 wt. % solids or to sulfonated perfluorocyclobutane ionomer in 1-propanol at 11.11 wt. % solids and the dispersions are coated onto windowpane glass using a 6-mil Bird applicator (Gardco) and an Erichsen coater. The membranes are then dried on the platen at 80° C. and then the coated membrane films are floated off the glass with water and air dried.

Polyelectrolyte Membranes Containing Emulsion Particles. The emulsion particles are about 150-nm in diameter. The particles are added at between 5 and 15 wt. % loading based on ionomer solids to NAFION™ DE2020 in aqueous 1-propanol at 20 wt. % solids or to sulfonated perfluorocyclobutane ionomer in 1-propanol at 11.11 wt. % solids using an IKA homogenizer (Turrax T25). The dispersions are coated onto windowpane glass using a 6-mil Bird applicator (Gardco) and an Erichsen coater. The membranes are then dried on the platen at 80° C. and then the coated membrane films are floated off the glass with water and air dried.

Emulsion Polymerization of 60 wt. %-Styrene and 40 wt. %-Divinylbenzene with Persulfate. In a soda pop bottle (6.5 fluid ounces) with a magnetic stirrer is placed 100 g water, 0.1 g potassium persulfate, 0.1 g sodium hydrogen phosphate, and 1 g sodium dodecyl sulfate. After this mixture dissolved, a mixture of styrene (10.446 g) and divinylbenzene (6.964 g) is added and the bottle is sealed with a rubber septum. Argon is passed over the emulsion to replace the air and disperse the reactants. The argon is removed and the mixture in the sealed bottle is stirred at 60° C. for 18 h, then 95° C. for 2 h. The latex contains 3.34 g of coarse polymer solids which are filtered off (with an 100-µm polypropylene mesh, Sefar) and discarded. The remaining emulsion is transferred to a dialysis tube and dialyzed for 1 week with frequent water changes. After freeze-drying 13.9 g of product is obtained.

Emulsion Polymerization of 4'-Vinyl benzo-18-crown-6. To a 50-mL, one-neck flask with a 14/20 joint is added a stir bar, water (10 g), potassium persulfate (0.005 g), sodium hydrogen phosphate (0.005 g), and sodium dodecyl sulfate (0.05 g). After this mixture dissolves, 4'-vinylbenzo-18-crown-6 (Sigma-Aldrich, 1 g) and freshly distilled divinylbenzene (1 drop, 0.05 g) is added. The flask is then equipped with a reflux condenser, a yellow Keck clamp, and a rubber suba seal septum for sparging the liquid with argon using a long needle for an argon gas inlet and another needle connected to a silicone oil bubbler for an exit. Argon is passed over the emulsion to replace the air and disperse the reactants for 30 minutes. The argon is removed and the mixture in the sealed flask is stirred in a 70° C. oil bath for 2 h, then at 95° C. (oil bath set temperature) for 16 h. The cooled emulsion is transferred to a dialysis tube (Spectropore) and dialyzed for 1 week with frequent water changes. After freeze-drying 0.9 g of poly(vinylbenzo-18-crown-6) is obtained in the form of 120 nm diameter white beads. These beads are added to ionomer solutions such as TCT891. One fuel cell test is performed with the beads remaining suspended in the ionomer solution before coating at 5 wt. % poly(vinylbenzo-18-crown-6) based on ionomer solids. Another fuel cell test is performed after centrifuging the ionomer mixture and decanting the ionomer solution from the sediment at the bottom of the centrifuge vessel. The liquid ionomer phase is then coated into a fuel cell membrane. The particle size of the poly(vinylbenzo-18-crown-6) is shown below. TCT891 is a perfluorocyclobutane (compound 56) multi-block co-polymer with perfluorosulfonic acid side groups available from Tetramer Technologies, LLC. The structure is shown below. The molar ratio of biphenyl to hexafluoroisopropylidene biphenyl moieties is 2 to 1, and the ion exchange capacity of the polymer is 1.55 meq H$^+$/g ionomer. The overall number average molecular weight of the polymer by size exclusion chromatography is 60,000, while that of the biphenyl chains is about 8,000. The hexafluoroisopropylidene biphenyl groups are interspersed between the 8000 molecular weight biphenyl segments in a less defined way, because these are introduced individually during the polymerization instead of being added as an oligomer segment. The polydispersity of the polymer, defined as weight average molecular weight divided by number average molecular weight, is 1.3. The polymer is soluble in alcohols (methanol, ethanol, 1-propanol and isopropanol) and in polar aprotic solvents such as N,N-dimethylacetamide, N,N-dimethylformamide, and N-methylpyrrolidone.

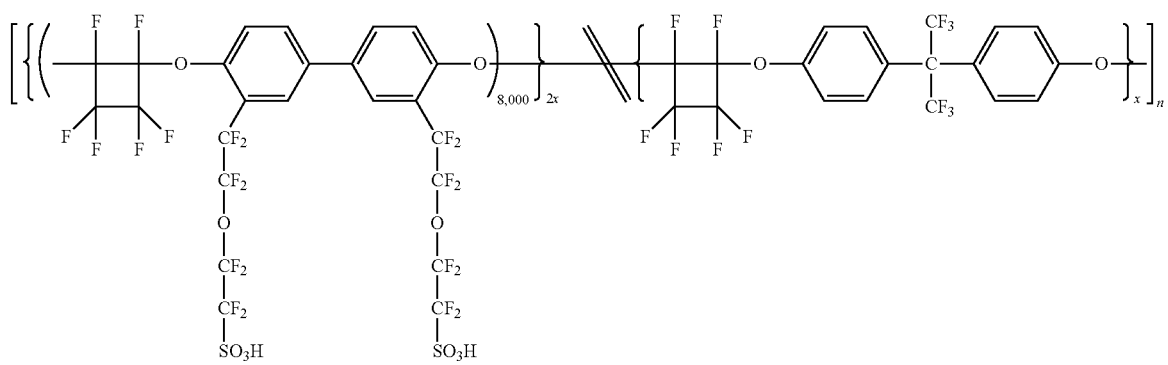

(56)

Polymers with this structure are further described in U.S. Pat. Nos. 7,897,691; 7,960,046; and 8,053,530.

Figure 9:
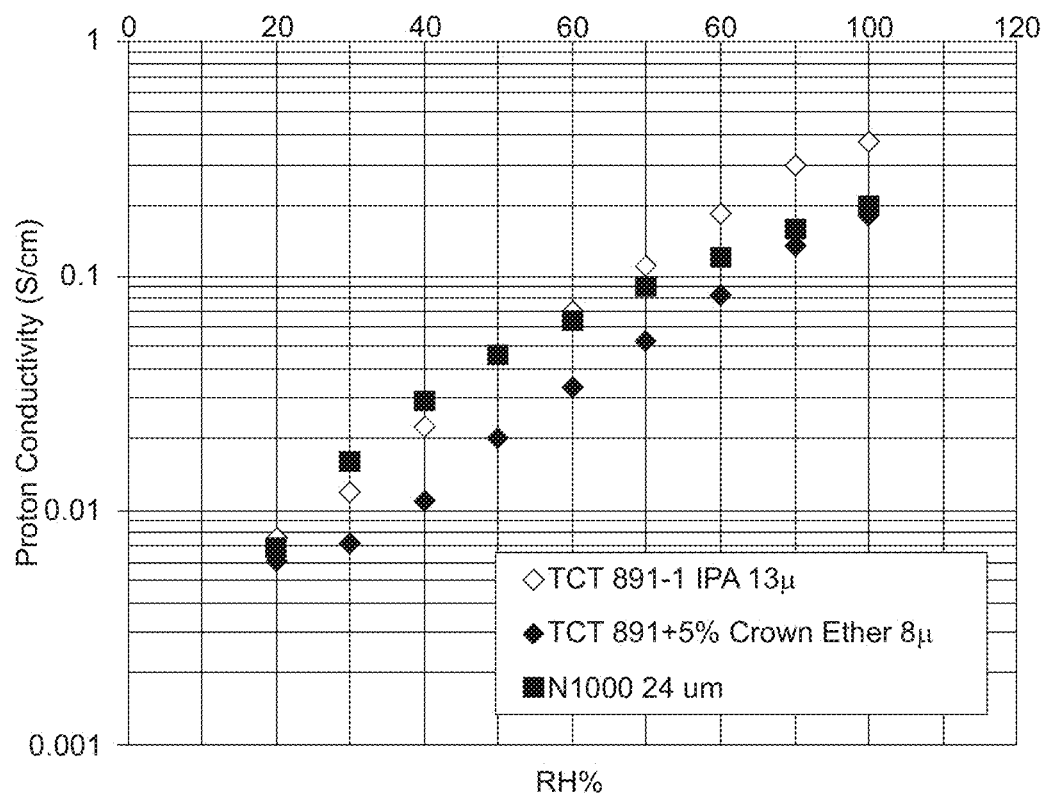
FIG. 9 provides a plot of the proton conductivity versus relative humidity for a perfluorocyclobutane block copolymer ionomer with perfluorosulfonic acid side groups (PFCB-PFSA, see structure below) membrane having polymeric crown ether nanoparticles. (NAFION™ DE2020, designated "N1000 24μ", membrane is provided as a reference)
Figure 10:
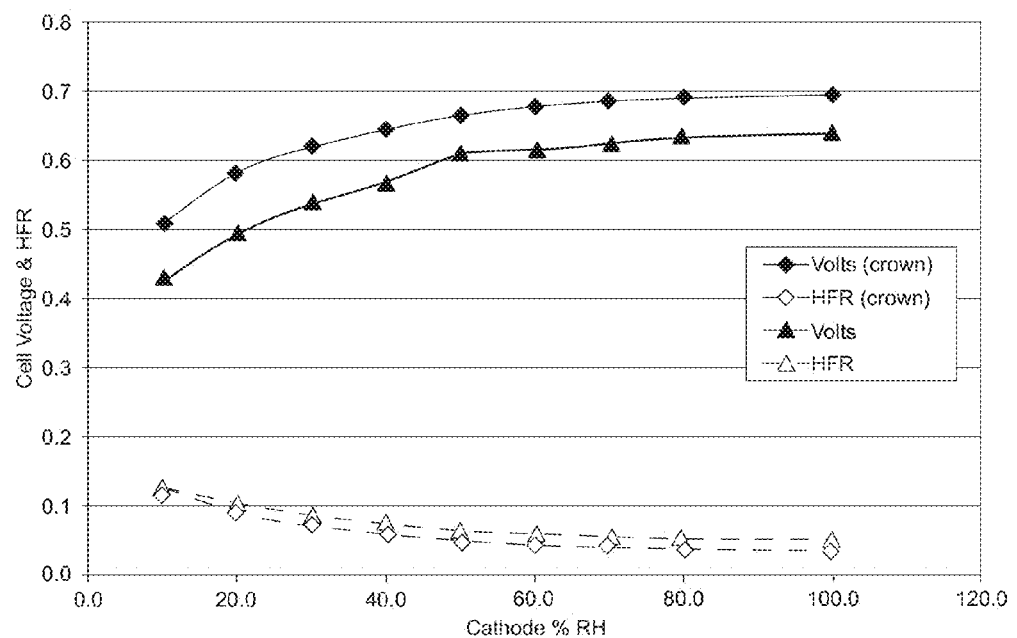
FIG. 10 provides a plot of the fuel cell performance for a 50 $cm^2$-active area of cell voltage and high frequency resistance (HFR) at 1.5 $A/cm^2$ versus % R.H. at the cathode for a PFCB-PFSA membrane with 5 wt. % nano-particulate poly(vinylbenzo18-crown-6) added (higher-performing gray curve) and one without the polymeric crown ether additive (black curve) at 150 kPa.

FIG. 9 provides a plot of the proton conductive versus relative humidity for a PFCB-PFSA membrane having polymeric crown ethers (NAFION™ DE2020 membrane is provided as a reference). Although the proton conductivity of the membrane containing the poly(vinylbenzo-18-crown-6) is lower than that without the additive, the fuel cell performance of the membrane with the additive after centrifugation is better than the membrane before treatment. FIG. 10 provides a plot of the fuel cell performance for a 50 cm$^2$-active area of cell voltage and high frequency resistance at 1.5 A/cm$^2$ versus relative humidity showing the performance advantage for the centrifuged crown-treated ionomer membrane [with 5 wt. % poly(vinylbenzo-8-crown-6) nanoparticles] as compared with that of the membrane made with the as-received ionomer.

Figure 11:
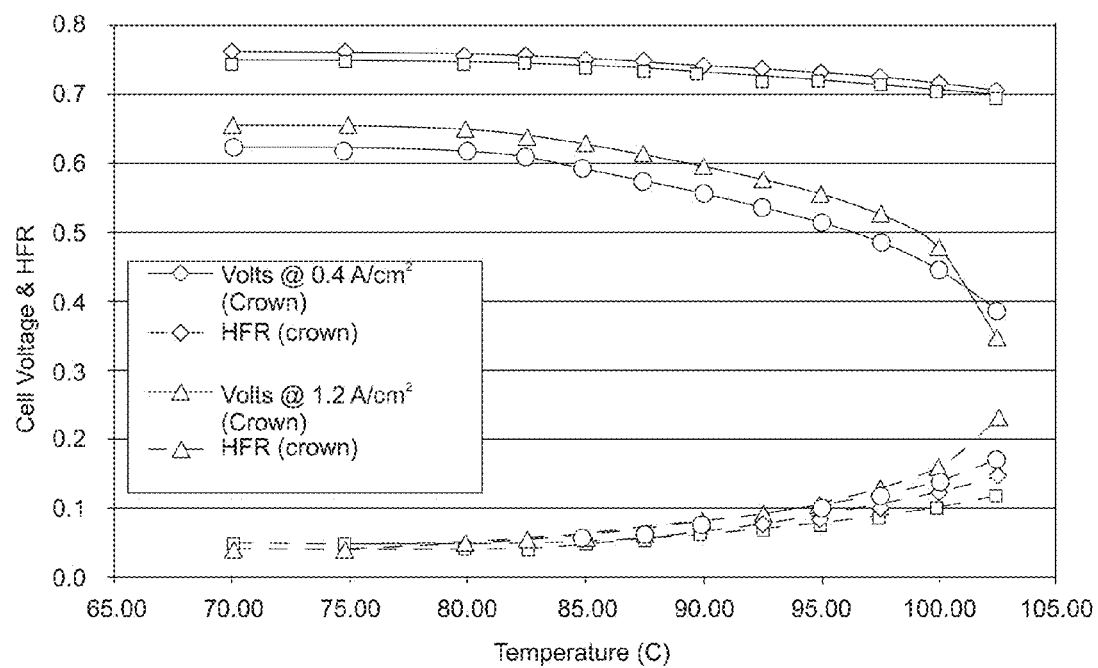
FIG. 11 provides a plot of the fuel cell performance versus fuel cell temperature for a 50 $cm^2$-active area of cell voltage and high frequency resistance at 0.4 and 1.2 $A/cm^2$ for a PFCB-PFSA membrane with 5 wt. % nano-particulate poly (vinylbenzo18-crown-6) added.
Figure 12:
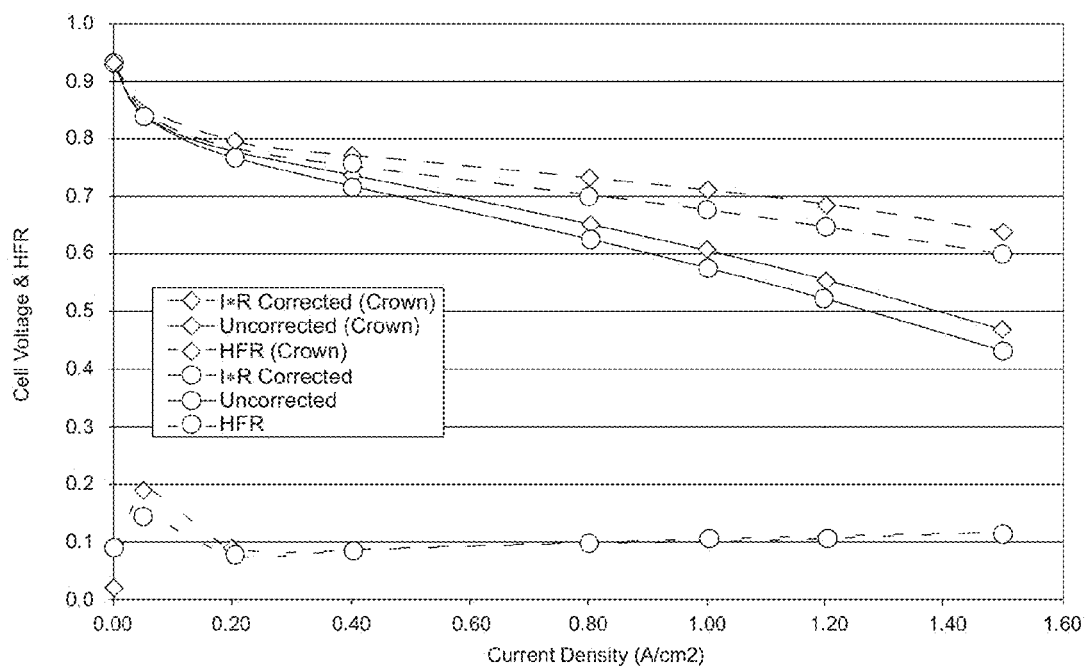
FIG. 12 provides a comparison of plots of the cell voltage and high frequency resistance versus current density at 55% relative humidity (R.H.) for PFCB-PFSA membranes prepared with and without 5 wt. % polymeric cyclic polyethers.
Figure 13:
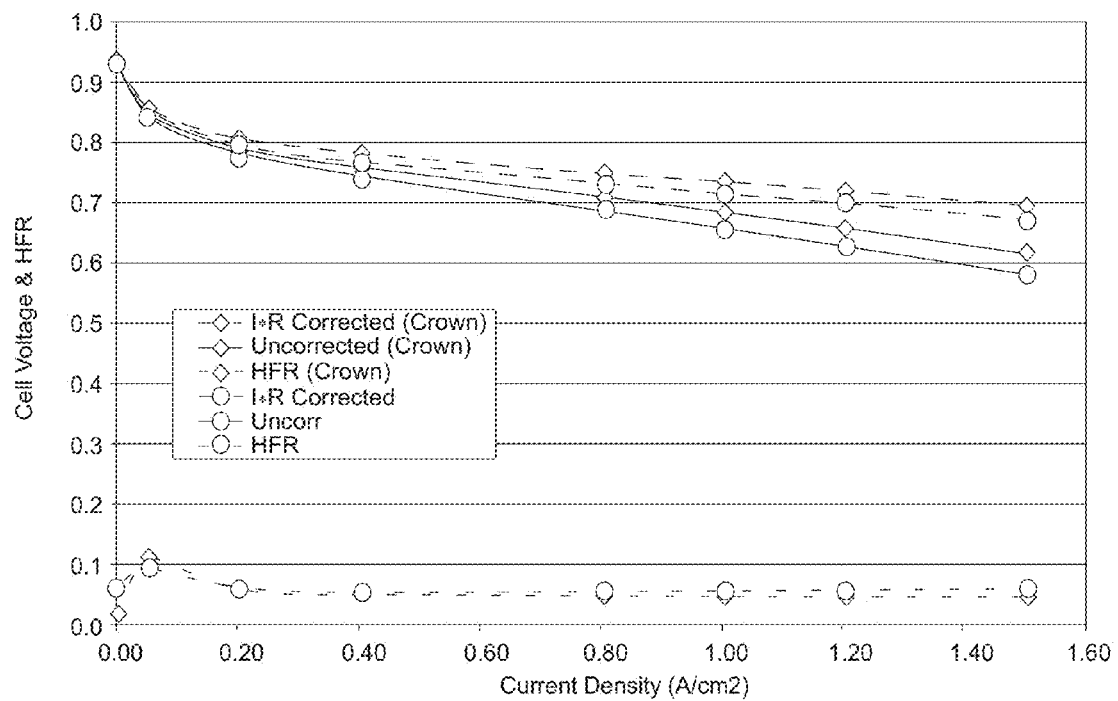
FIG. 13 provides a comparison of plots of the cell voltage and high frequency resistance versus current density at 85% R.H. for PFCB-PFSA membranes made with and without 5 wt. % cyclic polyethers.
Figure 14:
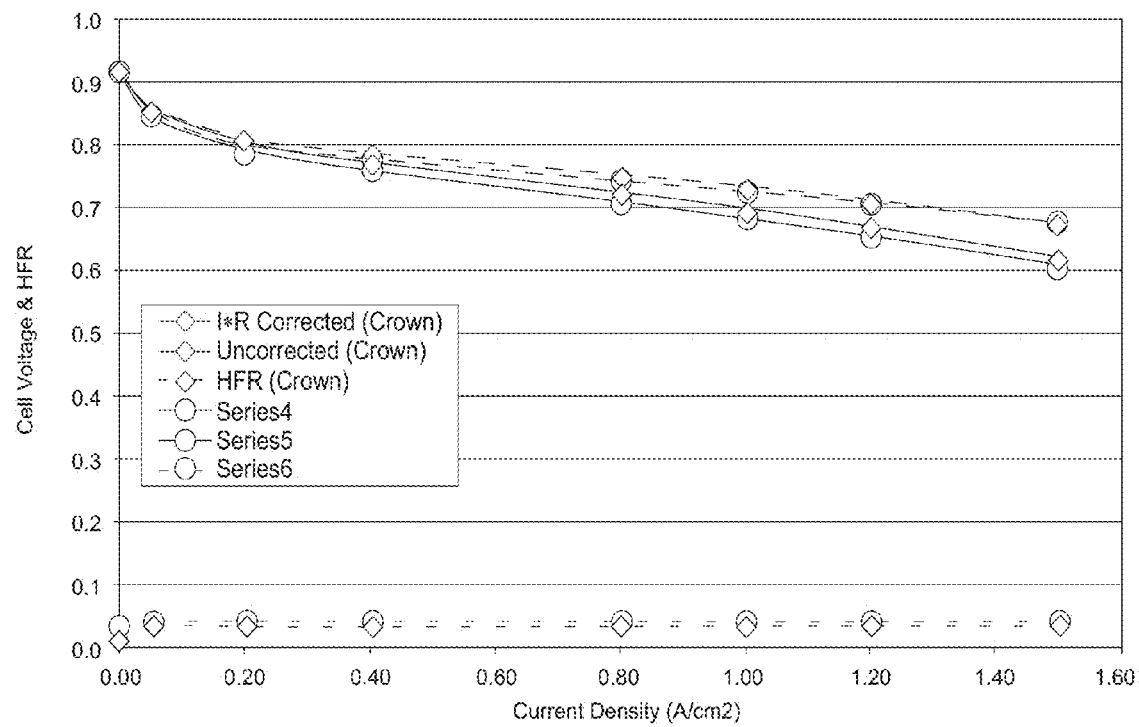
FIG. 14 provides plots of the cell voltage and high frequency resistance versus current density at 150% R.H. for PFCB-PFSA membranes made with and without 5 wt. % cyclic polyethers.

FIG. 11 is a plot of fuel cell performance versus temperature at 0.4 and 1.2 A/cm$^2$ for a PFCB-PFSA membrane with 5 wt. % nano-particulate poly(benzo-18-crown-6). FIGS. 12, 13 and 14 illustrate the performance enhancements of the centrifuged crown-containing membrane in the polarization curves at 55%, 85%, and 150% cathode out relative humidity (RH). FIGS. 12, 13 and 14 provide plots of the cell voltage and high frequency resistance versus current for various membranes having polymer with cyclic polyethers [5 wt. % poly(vinylbenzo-18-crown-6)].

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A membrane electrode assembly of a fuel cell, the membrane electrode assembly comprising:
   a proton conducting membrane having a first side and a second side, the proton conducting membrane including:
   a first polymer having cyclic polyether groups bonded thereto, the first polymer being a linear polymer has the following formula:

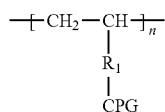

where CPG is a cyclic polyether group, wherein one or more atoms in the cyclic polyether group is substituted by a nitrogen atom; and
   a second polymer having sulfonic acid groups;
   an anode catalyst layer disposed over the first side of the proton conducting layer; and
   a cathode catalyst layer disposed over the second side of the proton conducting layer, the membrane electrode assembly adapted to be positioned in the fuel cell.

2. The membrane electrode assembly of claim 1 wherein the first polymer including cyclic ether groups is present in an amount from about 1 to about 15 weight percent of the total weight of the proton conducting membrane.

3. The membrane electrode assembly of claim 1 wherein the cyclic polyether groups are cyptands or crown ethers.

4. The membrane electrode assembly of claim 1 wherein $R_1$ is $C_{1-20}$alkyl, $C_{6-20}$alkylaryl, or $C_{6-20}$aryl.

5. The membrane electrode assembly of claim 4 wherein CPG is selected from the group consisting of:

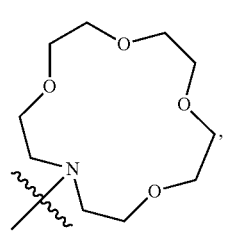

(4)

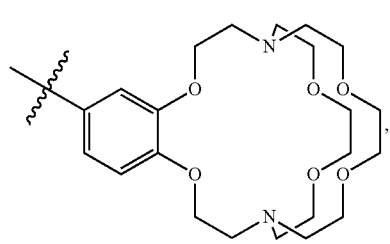

(7)

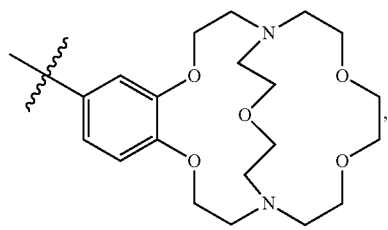

(8)

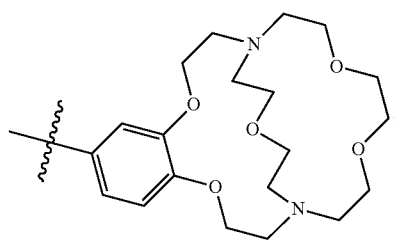

(14)

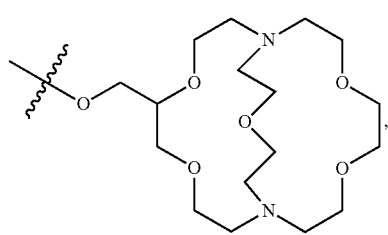

(15)

(16)

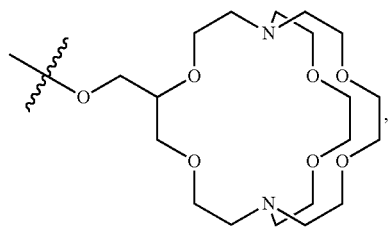

(17)

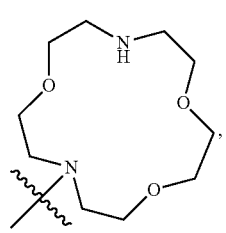

(18)

(19) 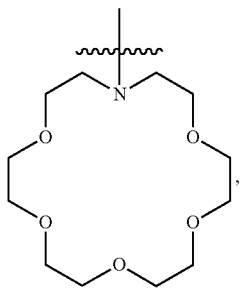

(20) 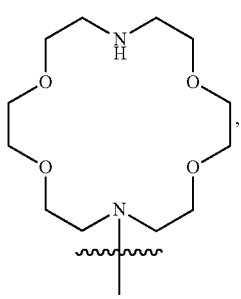

(21) 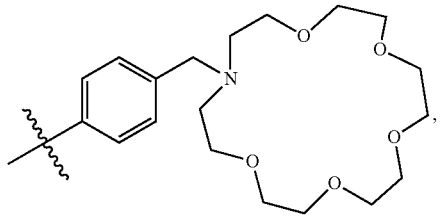

and

(22) 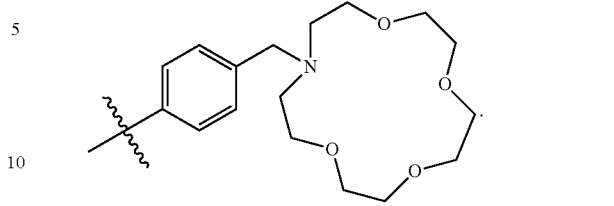

6. The membrane electrode assembly of claim 1 wherein the second polymer having sulfonic acid groups includes a component selected from the group consisting of perfluorosulfonic acid (PFSA) polymers, polymers having perfluorocyclobutyl moieties, and combinations thereof.

7. The membrane electrode assembly of claim 1 wherein the second polymer having sulfonic acid groups includes a copolymer containing a polymerization unit having the following formula:

$$CF_2=CF-(OCF_2CFX^1)_m-O_r-(CF2)_q-SO_3H$$

where m represents an integer of from 0 to 3, q represents an integer of from 1 to 12, r represents 0 or 1, and $X^1$ represents a fluorine atom or a trifluoromethyl group; and tetrafluoroethylene.

8. The membrane electrode assembly claim 1 wherein the second polymer having sulfonic acid groups includes perfluorocyclobutyl moieties having the following formulae:

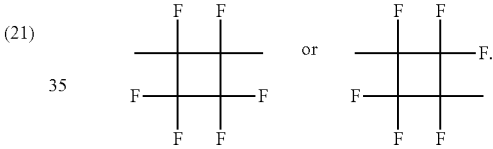

9. The membrane electrode assembly of claim 1 wherein the cyclic polyether group is a cryptand.

10. The membrane electrode assembly of claim 1 further comprising a polymer having perfluorocyclobutyl moieties.

* * * * *